(12) United States Patent
Cantwell et al.

(10) Patent No.: US 10,730,252 B2
(45) Date of Patent: Aug. 4, 2020

(54) LIGHTWEIGHT COMPOSITE SINGLE-SKIN SANDWICH LATTICE STRUCTURES

(71) Applicants: Khalifa University of Science and Technology, Abu Dhabi (AE); AEROSPACE HOLDING COMPANY LLC, Abu Dhabi (AE)

(72) Inventors: Wesley James Cantwell, Abu Dhabi (AE); Rehan Umer, Abu Dhabi (AE)

(73) Assignees: KHALIFA UNIVERSITY OF SCIENCE AND TECHNOLOGY, Abu Dhabi (AE); AEROSPACE HOLDING COMPANY LLC, Abu Dhabi (AE)

(*) Notice: Subject to any disclaimer, the term of this patent is extended or adjusted under 35 U.S.C. 154(b) by 262 days.

(21) Appl. No.: 14/704,177

(22) Filed: May 5, 2015

(65) Prior Publication Data

US 2016/0279885 A1     Sep. 29, 2016

Related U.S. Application Data

(63) Continuation-in-part of application No. 14/665,594, filed on Mar. 23, 2015, now abandoned, and a
(Continued)

(51) Int. Cl.
*B29C 70/54* (2006.01)
*B29C 70/36* (2006.01)
(Continued)

(52) U.S. Cl.
CPC ............ *B29C 70/543* (2013.01); *B29C 70/16* (2013.01); *B29C 70/342* (2013.01); *B29C 70/36* (2013.01);
(Continued)

(58) Field of Classification Search
CPC . B32B 7/08; B32B 2307/18; B32B 2262/106; B29C 70/543; B29C 70/16;
(Continued)

(56) References Cited

U.S. PATENT DOCUMENTS 3,138,506 A   6/1964 Ross et al.
3,943,980 A   3/1976 Rheaume et al.
(Continued)

FOREIGN PATENT DOCUMENTS

EP       0672805       9/1995

OTHER PUBLICATIONS

Definition of "imbed" from Merriam-Webster Dictionary (https://www.merriam-webster.com).*
(Continued)

*Primary Examiner* — Christopher T Schatz
*Assistant Examiner* — Cynthia L Schaller
(74) *Attorney, Agent, or Firm* — Hayes Soloway PC

(57) ABSTRACT

A single-skinned composite lattice sandwich structure includes a face sheet, fiber stringers, and at least one fiber tow arranged in a lattice structure separating the face sheet and fiber stringers. The face sheet and at least the fiber tow(s) forming the lattice may be interfused with a matrix to form a contiguous composite structure. The fiber stringers may be formed of various materials for imparting different structural properties to the sandwich structure, including carbon fiber for tensile strength and lightness, metallic or other rigid material for imparting overall structural rigidity, shape-changing material or actuated material for providing actuated deformation of the structure, and may also include sensors.

18 Claims, 13 Drawing Sheets

Related U.S. Application Data continuation-in-part of application No. 14/665,694, filed on Mar. 23, 2015, now abandoned.

(51) Int. Cl.
| | | |
|---|---|---|
| *B29C 70/34* | (2006.01) | |
| *B29C 70/16* | (2006.01) | |
| *B32B 7/08* | (2019.01) | |
| B29K 63/00 | (2006.01) | |
| B29K 105/08 | (2006.01) | |
| B29K 307/04 | (2006.01) | |
| B29L 31/30 | (2006.01) | |

(52) U.S. Cl.
CPC .............. *B29C 70/541* (2013.01); *B32B 7/08* (2013.01); *B29K 2063/00* (2013.01); *B29K 2105/08* (2013.01); *B29K 2307/04* (2013.01); *B29L 2031/3097* (2013.01); *B32B 2262/106* (2013.01); *Y02T 50/43* (2013.01)

(58) Field of Classification Search
CPC ..... B29C 70/36; B29C 70/342; B29C 70/541; Y02T 50/433; B29K 2105/08; B29K 2307/04; B29K 2063/00; B29L 2031/3097
See application file for complete search history.

(56) References Cited

U.S. PATENT DOCUMENTS

| | | | | |
|---|---|---|---|---|
| 4,389,447 | A | | 6/1983 | Disselbeck et al. |
| 6,128,998 | A | * | 10/2000 | Freitas ................. B29C 70/222 |
| | | | | 87/1 |
| 6,450,450 | B1 | * | 9/2002 | MacDonald ............ B29C 70/24 |
| | | | | 244/126 |
| 2002/0170941 | A1 | | 11/2002 | Wallach et al. |
| 2003/0170441 | A1 | * | 9/2003 | Boyle ................. B29D 24/004 |
| | | | | 428/297.4 |
| 2004/0128946 | A1 | | 7/2004 | Salmon et al. |
| 2005/0112347 | A1 | * | 5/2005 | Schmidt ................. B32B 15/08 |
| | | | | 428/292.1 |
| 2009/0280294 | A1 | * | 11/2009 | Branca ................. B29C 70/086 |
| | | | | 428/138 |
| 2010/0054877 | A1 | | 3/2010 | Buttrick, Jr. et al. |
| 2010/0323181 | A1 | | 12/2010 | Nutt et al. |
| 2011/0087442 | A1 | * | 4/2011 | Iannone .............. G01M 5/0041 |
| | | | | 702/34 |
| 2012/0177872 | A1 | | 7/2012 | Tsai et al. |
| 2013/0099050 | A1 | * | 4/2013 | Sanderson ................ B64C 3/56 |
| | | | | 244/49 |
| 2013/0276308 | A1 | | 10/2013 | Kang et al. |
| 2014/0061385 | A1 | * | 3/2014 | Dan-Jumbo .............. B64C 3/20 |
| | | | | 244/123.1 |
| 2014/0377556 | A1 | | 12/2014 | Boursier |
| 2015/0274902 | A1 | | 10/2015 | Harshe et al. |
| 2016/0279884 | A1 | | 9/2016 | Cantwell et al. |
| 2016/0279899 | A1 | | 9/2016 | Cantwell et al. |

OTHER PUBLICATIONS

U.S. Appl. No. 14/665,594, filed Mar. 23, 2015, Titled: Method of Manufacturing Lightweight Composite Lattice Structures.
U.S. Appl. No. 14/665,694, filed Mar. 23, 2015, Titled: Lightweight Composite Lattice Structures.
U.S. Appl. No. 14/665,594, "Non-Final Office Action," dated Jun. 15, 2017, 22 pages.
U.S. Appl. No. 14/665,594, "Final Office Action," dated Nov. 30, 2017, 24 pages.
U.S. Appl. No. 14/665,694, "Non-Final Office Action," dated Jul. 14, 2017, 24 pages.

* cited by examiner

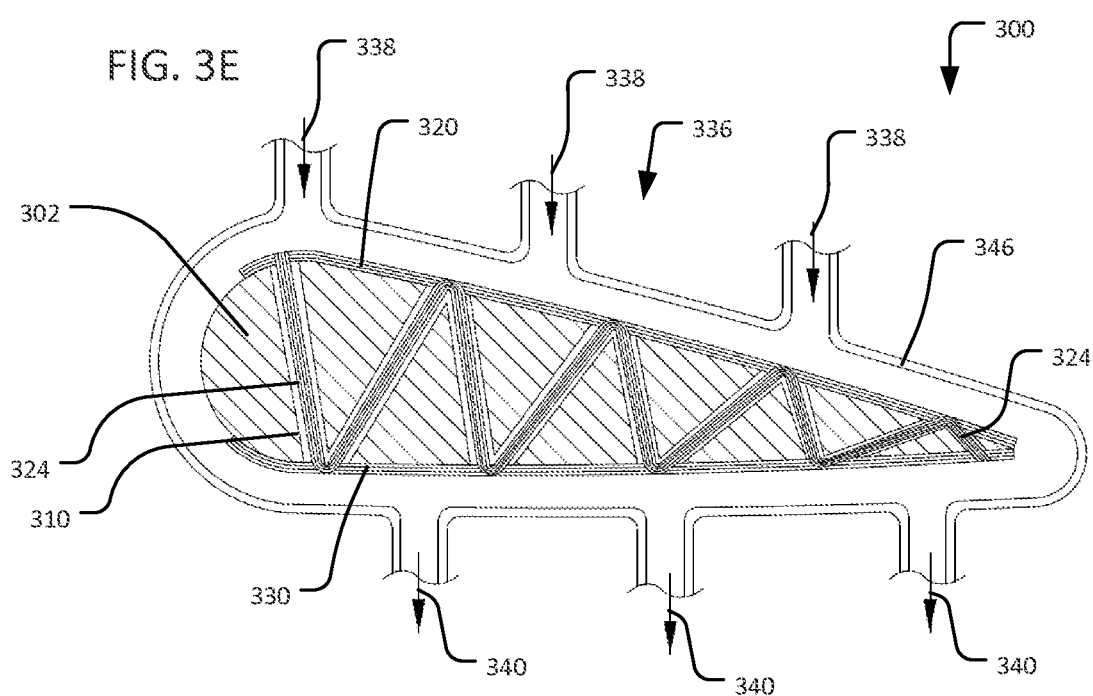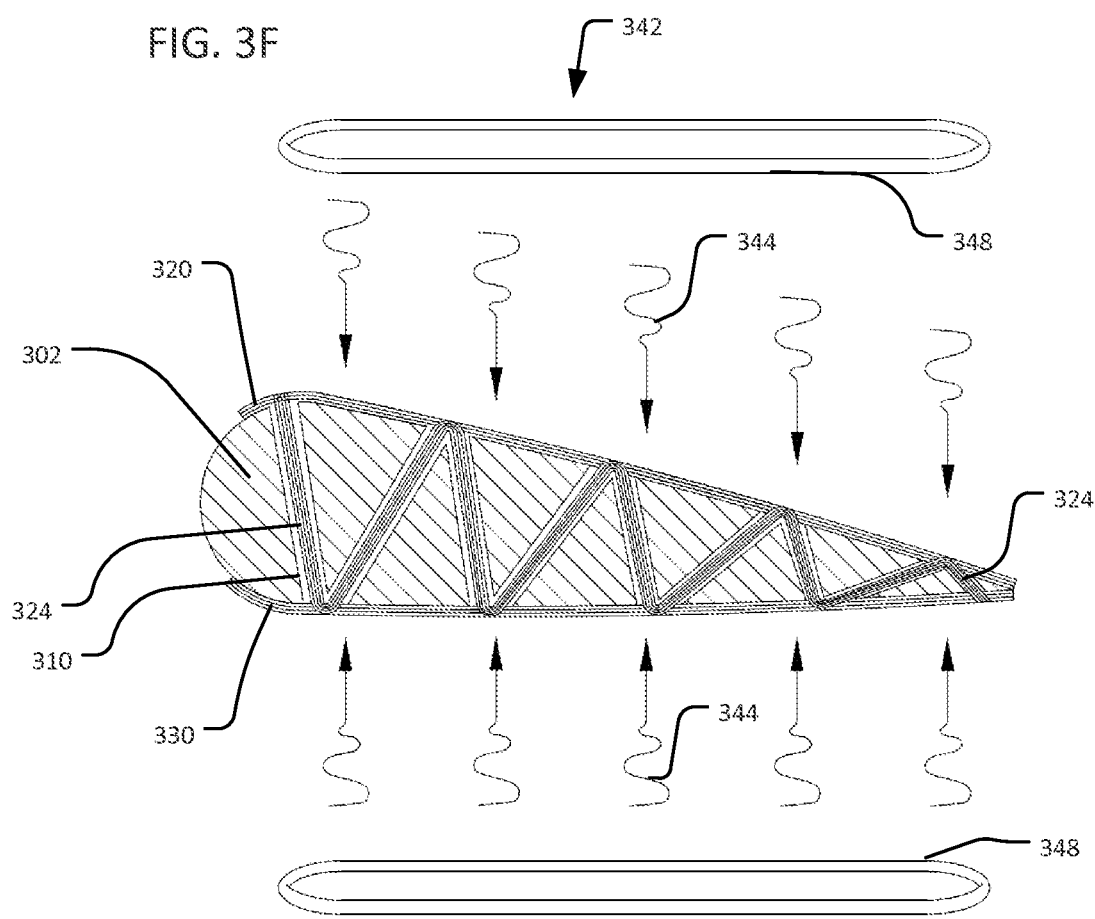

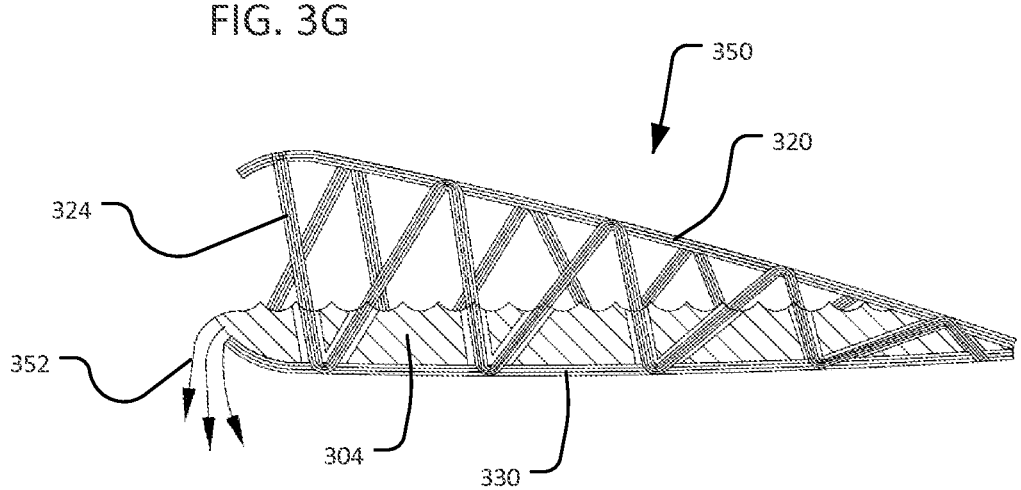

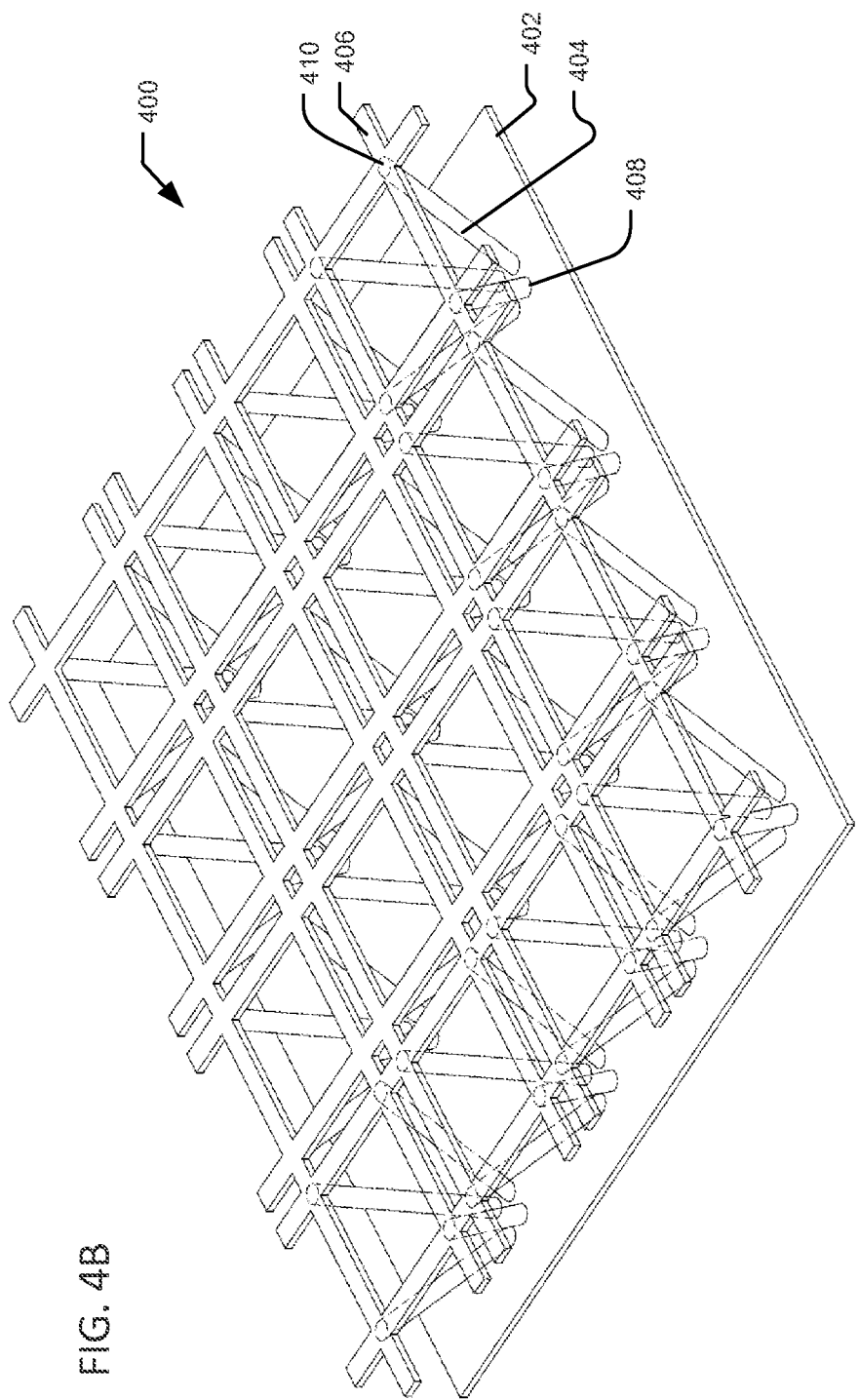

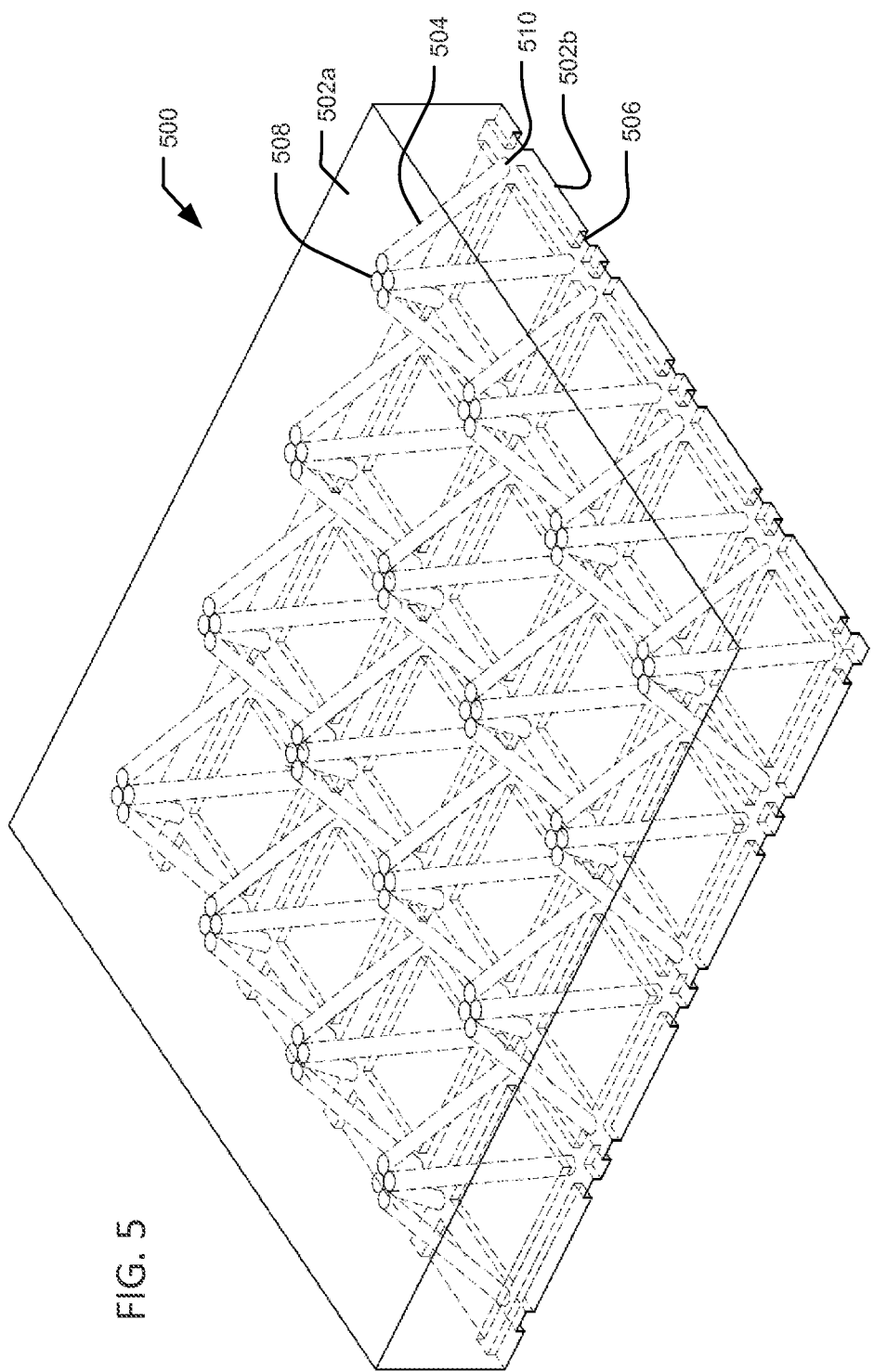

LIGHTWEIGHT COMPOSITE SINGLE-SKIN SANDWICH LATTICE STRUCTURES

CROSS-REFERENCES TO RELATED APPLICATIONS

This application is a continuation-in-part of pending U.S. patent application Ser. No. 14/665,594, entitled "METHOD OF MANUFACTURING LIGHTWEIGHT COMPOSITE LATTICE STRUCTURES," and U.S. patent application Ser. No. 14/665,694, entitled "LIGHTWEIGHT COMPOSITE LATTICE STRUCTURES," both of which are incorporated by reference.

BACKGROUND

Fiber-reinforced composites are integrated into parts for high-strength/low-weight applications, such as aerospace structures, due to their high strength-to-weight ratio. However, composites tend to possess a variety of drawbacks that prevent adoption into all applications for which this ratio is important. Composite beams may be extraordinarily strong in tension, but in compression may be subject to a variety of failure modes such as: matrix splitting, wherein the ends of a composite beam separate along planes between the fibers sheets and the beam splits down the middle; small-scale and large-scale buckling, wherein the individual fibers or the whole beam bends and fractures (respectively); or delamination, wherein the fibers may separate from one another along a shear plane between the fibers. Composite construction tends to be expensive and time-consuming where the geometries of parts are complex. Various parts of the construction process, for example cutting and attaching composite parts, may introduce surface imperfections which significantly diminishing strength. Therefore, in conventional composite manufacturing, increasing complexity may be correlated with ever greater risk of part failure.

At least a substantial part of the weight of a composite structure may be attributable to the matrix. Even though substituting a fiber-reinforced composite for metal or other materials in a structure may significantly reduce the weight of the overall structure, the weight savings may be further enhanced by reducing the volume of sections of the composite part that are infused with a matrix.

BRIEF SUMMARY

Embodiments disclosed herein relate to, for example, a composite lattice structure formed of one or more face sheets connected with lattice members, where the lattice members are formed of single or multiple contiguous fiber tows in a matrix. In embodiments, fiber tows may abut, weave through, or both abut and weave through parts of the face sheet or sheets to form the lattice structures. The lattice members and face sheets may additionally be formed of and connected to one another by being interfused with the matrix.

At least some embodiments relate to a method of making composite lattice structures such as those described above by threading one or more fiber tows through bores of a removable pattern in a lattice configuration, covering the pattern and lattice members in one or more face sheets, and interfusing the assembly of pattern, lattice members and face sheets with a matrix. The fluid matrix material is interfused into the face sheets and bores and then cured to form a rigid matrix. The pattern is then removed from around the matrix. When the pattern is removed, the matrix-filled volume where the bores had been disposed forms a composite lattice structure. Parts may be strengthened by interweaving the fibers of the lattice members with the face sheets.

At least some embodiments further relate to, for example, composite lattice single-skinned sandwich structures formed of a face sheet connected with lattice members. The lattice members are formed of single or multiple contiguous fiber tows in a matrix, and are attached with the face sheet. The fiber tows may abut the face sheet, may weave through parts of the face sheet, may be mechanically attached with the face sheet, and/or may be interfused with the same matrix material along with the face sheet. Ends of the lattice members not abutting the face sheet can additionally connect with one or more stringers, and may be connected with the stringers by any of the means described above.

BRIEF DESCRIPTION OF THE DRAWINGS

Various embodiments in accordance with the present disclosure will be described with reference to the drawings, in which:

FIGS. 3A through 3G represent stages of a process for forming a fiber-reinforced composite lattice structure in accordance with embodiments, with FIG. 3A being a perspective view of a block of removable pattern material, in accordance with embodiments;

FIG. 3B is perspective view of a removable pattern, formed from the block of removable pattern material of FIG. 3A having a complex set of bores added, in accordance with embodiments;

FIG. 3C is a cutaway side view of a first process of winding a fiber tow through a section of the bores of the pattern of FIG. 3B and encasing the pattern in face sheets, in accordance with embodiments;

FIG. 3D is a cutaway side view of an alternative embodiment of a process of winding a fiber tow through a section of bores in the pattern of FIG. 3B, with the fiber being wound also through the face sheets;

FIG. 3E is a cutaway side view of an embodiment of a vacuum-assisted resin infusion process for permeating the face sheets, bores, and fiber tows with a matrix material;

FIG. 3F is a cutaway side view of an embodiment of a resin curing process being applied to the resin-infused face sheets, bores, and fiber tows of FIG. 3E so as to form a cured lattice structure;

FIG. 3G is a cutaway side view showing pattern material being removed from the cured lattice structure of FIG. 3F;

FIGS. 4A-4C show a composite single-skinned sandwich structure in accordance with an embodiment, in a variety views, including: a perspective view (FIG. 4A), an inverted perspective view (FIG. 4B), and a top-down view (FIG. 4C);

FIG. 5 shows a perspective view of a removable patterns for making the single-skinned sandwich structure of FIGS. 4A-4C in accordance with embodiments, the removable pattern having bores as well as grooves for cross-hatched stringers;

FIG. 6A shows a cross-sectional view representing a first stage of winding a fiber tow through bores in a removable pattern and applying a face sheet and fiber stringers to the removable pattern;

FIG. 6B shows a cross-sectional view representing winding a fiber tow through a face sheet and a stringer abutting the removable pattern shown in FIG. 6A;

FIG. 6C shows a cross-sectional view representing interfusing the assembly of a face sheet, fiber tows, stringers and the removable pattern shown in FIG. 6B with a matrix by way of a vacuum-assisted resin transfer process;

FIG. 6D shows a cross-sectional view representing removing the removable pattern shown in FIGS. 6A-6C in order to release a single-skinned sandwich structure.

These and other features, embodiments, and advantages of the present disclosure are better understood when the following Detailed Description is read with reference to the accompanying drawings.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various embodiments herein described are directed to lattice structures made of fiber-reinforced composite materials. The lattice structures have one or more face sheets connected with lattice members. One or more fiber tows create two or more lattice members in the lattice structure. Both or either of the lattice members and face sheets are a fiber-reinforced composite material. Some embodiments of the lattice members and face sheets can be formed as a single contiguous piece, and can be formed according to a method that uses a removable pattern.

In embodiments of such a method, the pattern is a removable material and has a complex array of through-holes or bores, such that a fiber tow can be interwoven throughout the bores of the removable pattern and connected with face sheets at an exterior of the pattern. Assembled fiber tows and face sheets can be permeated with a matrix and cured in order to produce a contiguous fiber-reinforced composite lattice structure. The pattern is then removed from the lattice structure, for example by melting the pattern.

DETAILED DESCRIPTION OF THE FIGURES

Figure 1A:
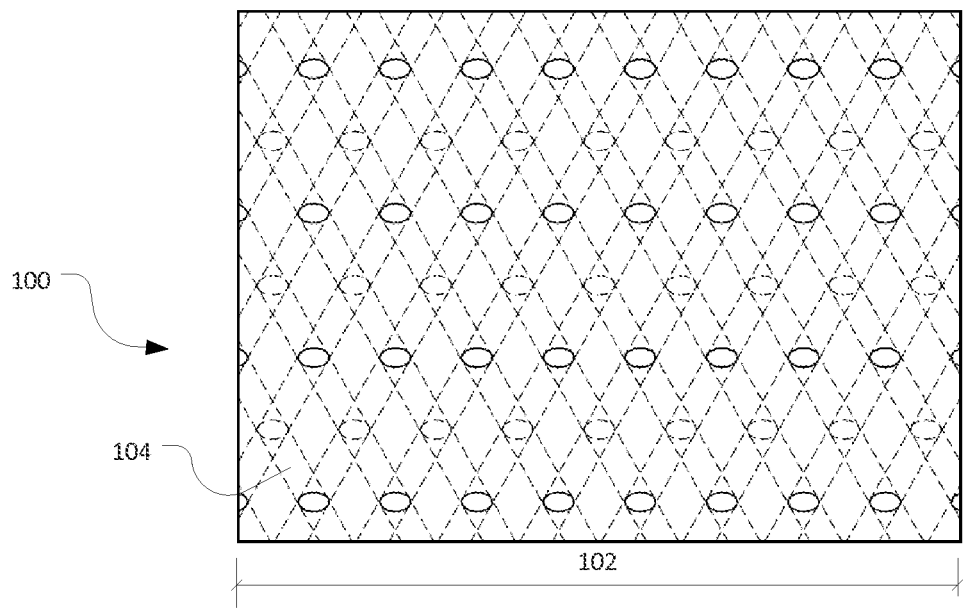
FIG. 1A is a top view of a composite lattice structure formed with fiber reinforced composite lattice members, in accordance with embodiments.

FIG. 1A is a top view of a lattice structure 100a formed with fiber reinforced composite lattice members 104a running in a pattern along a length 102 of the structure, in accordance with embodiments. Notably, the spacing, length, and angle of the lattice members may vary along a length or width of a part, depending on the desired geometry of the entire part as well as, for example, part-specific loading and strength requirements, or other desired attributes.

Figure 1B:
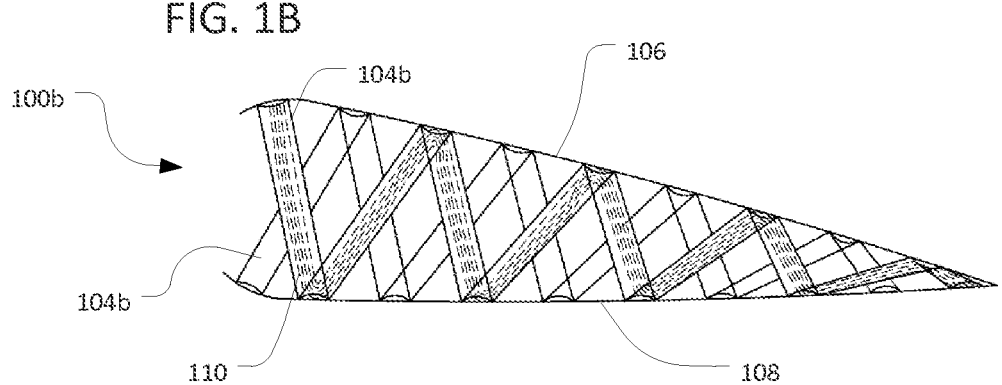
FIG. 1B is a side view of the structure shown in FIG. 1A.

FIG. 1B is a side view of a lattice structure 100b, formed with fiber reinforced lattice members 104b, showing an example of how lattice members may be configured according to at least one embodiment. The lattice members 104b in this example connect with both superior 106 and inferior 108 face sheets in a triangular truss configuration. Each member of the lattice members 104b is a fiber-reinforced composite beam formed of a bundle or tow 110 of substantially parallel fibers. The lattice members 104b and the face sheets 106, 108 are connected with one another at least by a matrix being infused with all parts, forming a composite material. In some embodiments, the lattice members 104b are connected with one another by adjacent members being formed of at least one continuous fiber tow 110, and by meeting at the face sheets 106, 108.

Composite material conventionally means a combination of two or more constituent materials wherein the combination has different properties that one or another of the materials alone. At least some embodiments in the present disclosure include fiber-reinforced composites, for example (but not limited to) carbon fiber suspended in a polymer matrix. Except where indicated otherwise, "composite" in the present disclosure will be defined generally as any fiber-reinforced or fabric-reinforced composite material.

The fibers in embodiments of the reinforced fiber/polymer composite material may be any fiber which is now or which may in the future become suitable for such a composite, for example, the fiber may be a glass, carbon, cellulose, high-strength polymer such as aramid fiber (or para-aramid fiber such as KEVLAR™), metallic wire, conductive or insulating filaments, any comparable fiber, natural fiber, or a combination of these fibers. In various embodiments, the fibers may be organized relative to one another in a pattern, for example, they may be woven, laid randomly, braided, twisted, or grouped into a tow comprising adjacent parallel fibers. In particular embodiments, the fiber may be carbon fiber filaments arranged in a tow of parallel fibers. In specific embodiments, the reinforcing carbon fiber tows may be CARBON 12K™ (made by Gurit, Inc.), or may be fiber tows extracted from a fiber face sheet (below).

Fiber face sheets may be used as a structural element in the lattice structure, for example as an outer skin of a sandwich structure, in accordance with embodiments. The fibers within a face sheet may be the same or different from the fibers used in the lattice members. In a specific embodiment, a face sheet may be a uni-directional carbon fiber sheet such as UT-C300™ (made by Gurit, Inc.), or may be a multi-ply sheet formed of multiple layers of face sheets laid across one another in two or more ply orientations. For example, in a stack of sheets having multiple ply orientations, the fibers of multiply layered sheets may run orthogonal to the fibers of a first sheet at 90 degrees, at 45 degrees, at 30 degrees, at 60 degrees, at any other angle, or any combination of angles and in any order. Additional fiber tows may also be used to thicken or reinforce fiber sheets where necessary to enhance the strength of the sheet, for example at points intended for attachment points, or at points intended to be load bearing; and face sheets may additionally be connected with one another by adhesive bonding.

Figure 1C:
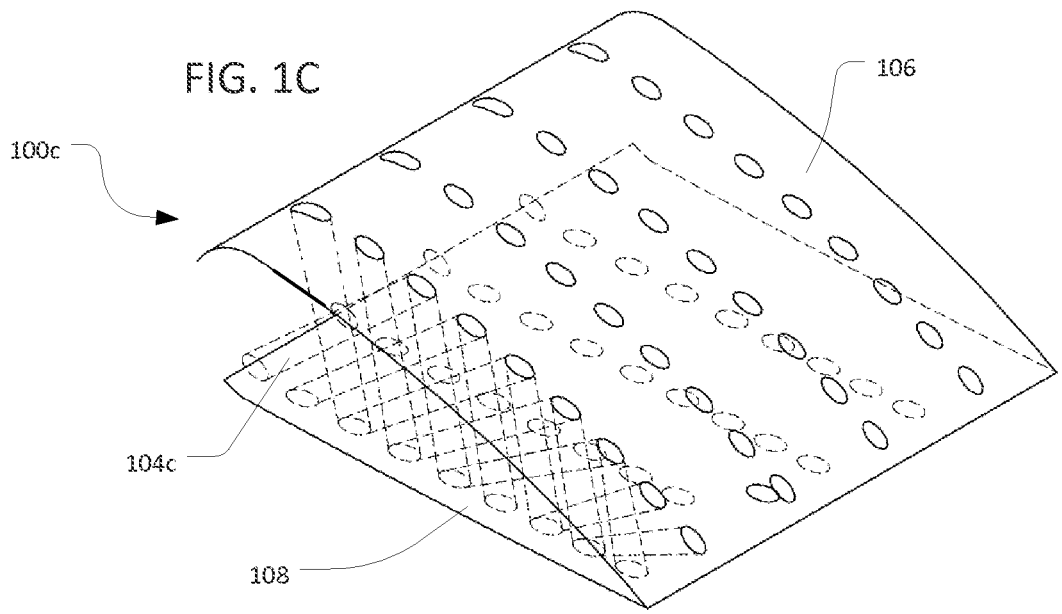
FIG. 1C is a perspective view of the structure shown in FIG. 1A.

FIG. 1C is a perspective view of a composite lattice structure 100c, similar to lattice structures 100a and 100b of FIGS. 1A and 1B, showing an example of an alternative configuration of lattice members according to at least one embodiment. Shown are superior 106 and inferior 108 face sheets and a partial selection of lattice members 104c. In particular, this view shows how a complex arrangement of lattice members may be positioned in relation to one another and within an arbitrary topology of the face sheets, in accordance with various embodiments, with the lattice members intersecting at a plurality of points between the face sheets.

In structural settings, a lattice generally provides stiffness to a larger structure while allowing it to remain relatively lightweight. In the present disclosure, a lattice refers to any structure that extends between and connects two surfaces or opposed portions of a curved surface, and individual beams within that structure are referred to as lattice members. In embodiments, lattice members may or may not be repeated. One form of lattice is a network of lattice members separating and supporting two or more face sheets in a sandwich-type lattice structure. In some embodiments, the lattice is a regular, repeated arrangement of intersecting members, such as a truss configuration, with repeating diagonal elements and straight members connecting the two face sheets. The supporting elements of the lattice are referred to as lattice members, and the totality of an assembly of face sheets and lattice members are referred to as a lattice structure.

In various embodiments, individual lattice members may cross from one face sheet to the other in a truss configuration along a plane that lays diagonal to the face sheets. In at least one embodiment, the planes on which these lattice members lie may cross proximate to an inner surface of one or the other of the face sheets, such that pairs of lattice members appear to "lean" toward one another, forming, for example, a repeating pyramidal configuration.

Figure 2A:
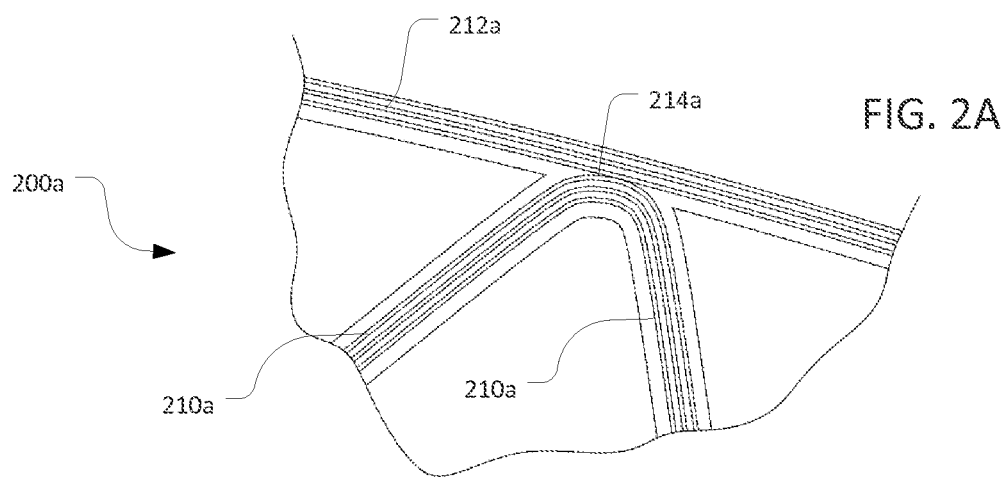
FIG. 2A is a cutaway side view of an embodiment of a composite lattice structure having fiber reinforced composite lattice members and a face sheet with fibers of the lattice members abutting the face sheet.

As described above, the lattice members are formed from fiber tow bundles. These fiber tow bundles align along the length of the lattice members. For example, FIG. 2A is a cutaway side view of an embodiment of two fiber-reinforced composite lattice members 210a that form part of a lattice structure 200a. The lattice members 210a meet at a surface of a face sheet 212a, with the fibers of the lattice abutting the face sheet at a contact point 214a. In the example schematic as shown, the fibers comprising the lattice members 210a are substantially parallel and straight for a length of a first lattice member, and then curve proximate to the face sheet, and then straighten again as part of a second lattice member. The fibers comprising lattice members may, in various embodiments, curve more or less abruptly than shown where they contact the face sheets; or they may contact a face sheet and then run parallel to that face sheet for a distance before curving to form an additional lattice member; or, one or more fiber tows may originate at and join the collection of fibers forming the lattice member at or proximate to a face sheet.

Specific embodiments of the lattice may have any lattice configuration, such as the square-pyramidal configuration shown, but variations of the embodiments may be any conventional three-dimensional lattice shape, for example: parallel columns; parallel two-dimensional planar trusses having triangular elements; three-dimensional triangular pyramidal (tetrahedral) lattices, combinations of tetrahedral lattices such as a Kagome lattice, three-dimensional square-pyramidal lattices, honeycomb or hexagonal lattice systems incorporating triangular elements; octet lattice structures; lattices incorporating round shapes such as bowed elements or wheel-and-spoke arrangements; and any other three-dimensional shape including both repeating truss-like structures and nonrepeating, arbitrary structures.

Figure 2B:
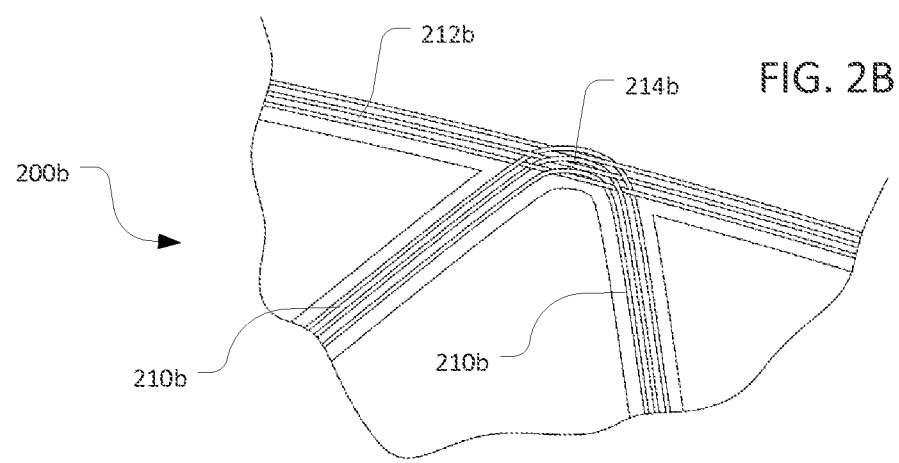
FIG. 2B is a cutaway side view of an embodiment of a composite lattice structure having fiber reinforced composite lattice members and a face sheet with fibers of the lattice interwoven with the face sheet.

FIG. 2B is a cutaway side view of an embodiment of fiber reinforced composite lattice members 210b that form part of a lattice 200b with a face sheet 212b, where the face sheet is at least partially composed of fibers, and at least some of the fibers of the lattice members are interwoven with the fibers of the face sheet 214b. The fibers of the beams may interweave with the fibers of the face sheet once or multiple times, and each fiber may interweave with one or more fibers. In the embodiment shown in FIG. 2B, the fibers of the beam each interweave with a at least one fiber of the face sheet, with some beam fibers interweaving with multiple face sheet fibers. The fibers within the lattice members may curve and depart from the face sheet in a short span; or the fibers may run parallel to or within a section of the face sheet such that the lattice members and face sheet are more tightly interwoven.

Figure 2C:
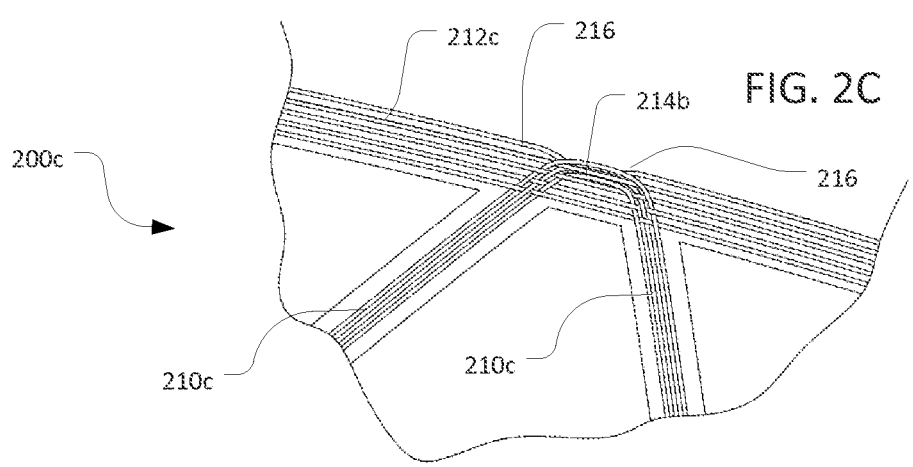
FIG. 2C is a cutaway side view of an embodiment of a composite lattice structure having fiber reinforced composite lattice members and a face sheet where subsets of the fibers diverge from the lattice members to pass along a surface of the face sheet.

FIG. 2C is a cutaway side view of an embodiment of fiber reinforced composite lattice members 210c that form part of a lattice 200c with a face sheet 212c. In this example, some fibers of the lattice members 210c are partially interwoven 214c with fibers of the face sheet 212c. Some fiber tows 216 diverge from the lattice members to run along a section of the face sheet.

Where more than two lattice members join a face sheet proximate to one another, fiber tows may branch at the intersections such that the fibers of multiply joined lattice members may be effectively interwoven with one another at the intersections. However, in certain embodiments, the fiber tows run continuously from one lattice member to one other lattice member, such that when multiple lattice members abut or join a face sheet at a point proximate to one another, the different fiber tows of two intersecting pairs of lattice members may abut one another without being interwoven. Furthermore, in various embodiments, the lattice members may be connected with the face sheets by one or more of: abutting the face sheets and being joined by the matrix; resting within an indentation or cavity in one or more of the face sheets; being partially interwoven with the abutting face sheets; being fully interwoven with the face sheets; being mechanically connected with the face sheets by a connector such as a pin, rivet, screw, bolt, or other connecting means; or some combination of the above connecting means.

In alternative embodiments, the fibers forming the composite lattice members may pass through two or more holes formed in a face sheet, rather than being interwoven, or in addition to being interwoven, with the face sheet. In addition, the face sheets may comprise more than one layer or ply of fiber fabric, and the fibers forming a lattice element may pass through one, multiple, or all layers making up said face sheet. The plies may be the same or they may be different materials, or they may be a stack of structural layers of monodirectional carbon fiber sheet laid in varying orientations, and may additionally include one or more woven fiber fabric layers. The fibers forming lattice members may interact with the face sheets in a variety of configurations. For example, a fiber tow making up lattice members may be partially interwoven with sections of one or more inferior layers in a multi-ply face sheet; and may abut without passing through one or more superior layers in the face sheet.

FIGS. 3A through 3G are representations of examples of process acts for a process 300 of forming a structure with a fiber reinforced composite lattice, in accordance with at least one embodiment. In particular, the process 300 forms a sandwich structure having two opposed face sheets (e.g., the face sheets 106) and a lattice of fiber-reinforced composite beams, but alternative embodiments of the process may be used to produce other structures.

Figure 3A:
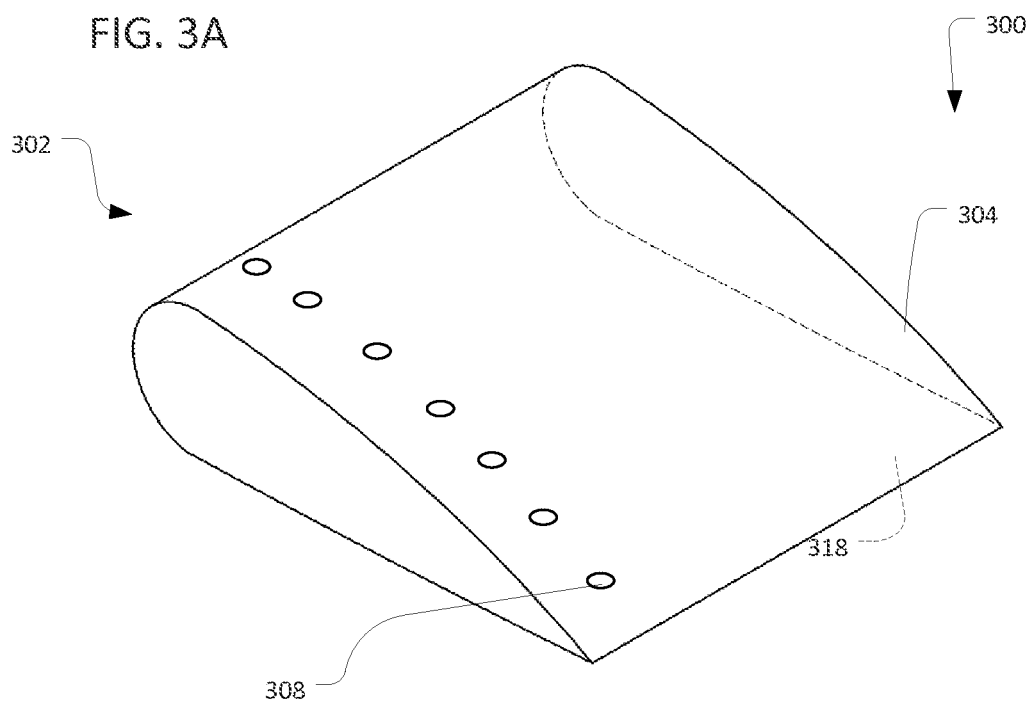

In embodiments, the process starts with a pattern. The pattern includes bores for forming the beams, and outer faces for receiving the face sheets, if used. FIG. 3A shows a perspective view of an embodiment of a pattern 302 including a superior face 304 and an inferior face 318. The outer faces 304 and 318 correspond to at least parts of an inner surface of a hollow or sandwich structure of the eventual lattice structure to be formed on the pattern; for example, the inner surface of a predominantly hollow airfoil. One or more nonworking portions 306 may correspond to an open edge or port in the outer skin of the desired structure, such as a joining region or end; for example a region where sections of an airfoil may be assembled together. The pattern may be initially formed inclusive of surface features 308, which may correspond to functional surface features in the desired structure, or may correspond to guides for, or to sections of bores through the material for forming internal structures.

The pattern may be formed of any removable material suitable for a lost-wax or investment casting technique, including but not limited to: wax blocks, plaster blocks, compressed granular blocks, dissolvable material such as rock salt, ceramic, frozen mercury, a non-wax polymer; or any other suitable removable material which is compatible with any or some combination of carving, machining, drilling and computer-numerically-controlled (CNC) machining. For example, in a specific embodiment, FERRIS® PURPLE FILE-A-WAX® carving and milling wax (made by Freeman Manufacturing and Supply Co.) is used, which has properties including heat resistance and CNC machining compatibility.

Embodiments of the pattern may be one piece, or may be several pieces or made of multiple patterns configured to be joined together. The pattern may be formed in one or more acts, and may, for example, be cast in a permanent or semi-permanent mold, cast in a temporary mold, or produced entirely by automated machining or by hand. The pattern also need not have a solid core, but in certain embodiments is preferably solid.

Figure 3B:
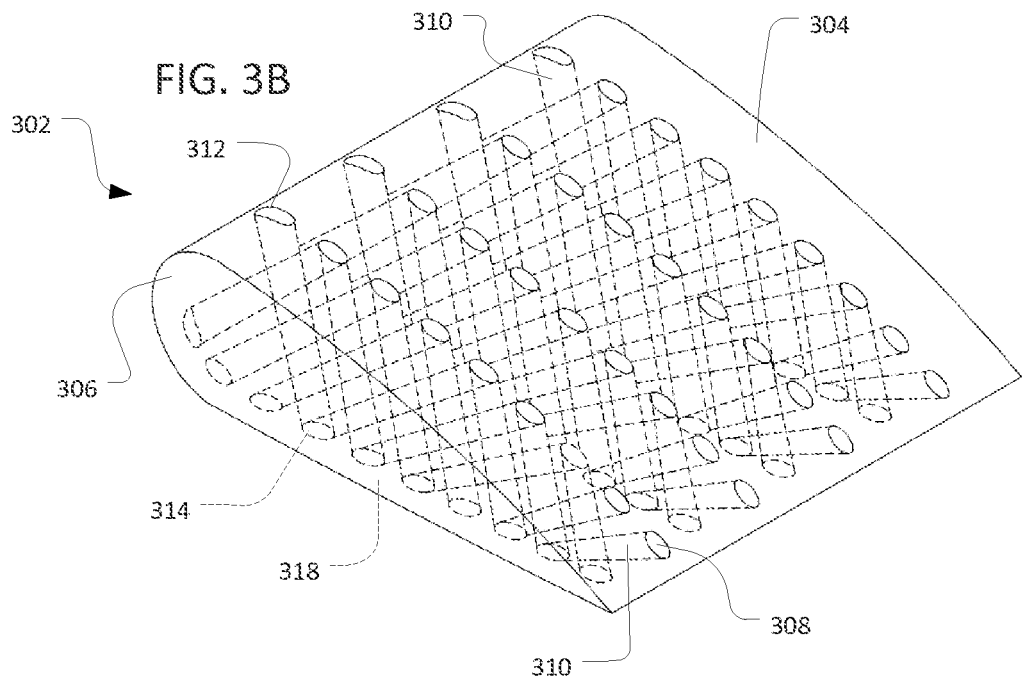

FIG. 3B shows a perspective view of a bored pattern 302 produced from a blank such as the blank pattern 302 of FIG. 3A, with bores 310 formed through the body of the pattern 302 in accordance with embodiments. The bores 310 may be formed by a variety of techniques, and may be formed after the pattern 302 is cast or at the same time. For example, in some embodiments of the process 300, a blank pattern 302 is formed in a mold and then a complex lattice network of bores is formed in the pattern by a series of drilling operations. The bores 310 connect between opposing faces 304 and 318 of the pattern 302 through openings 312 and 314 in, for example, the superior 304 and inferior 318 face of the pattern. The size of bores may be determined by choice of drill bit size, or if a CNC machine is used, bores sizes and shapes may be determined by the selection of a tool path. In embodiments, additional finishing, boring, or smoothing operations may be conducted on the pattern by machine or by hand after the bores 310 are formed.

Figure 3C:
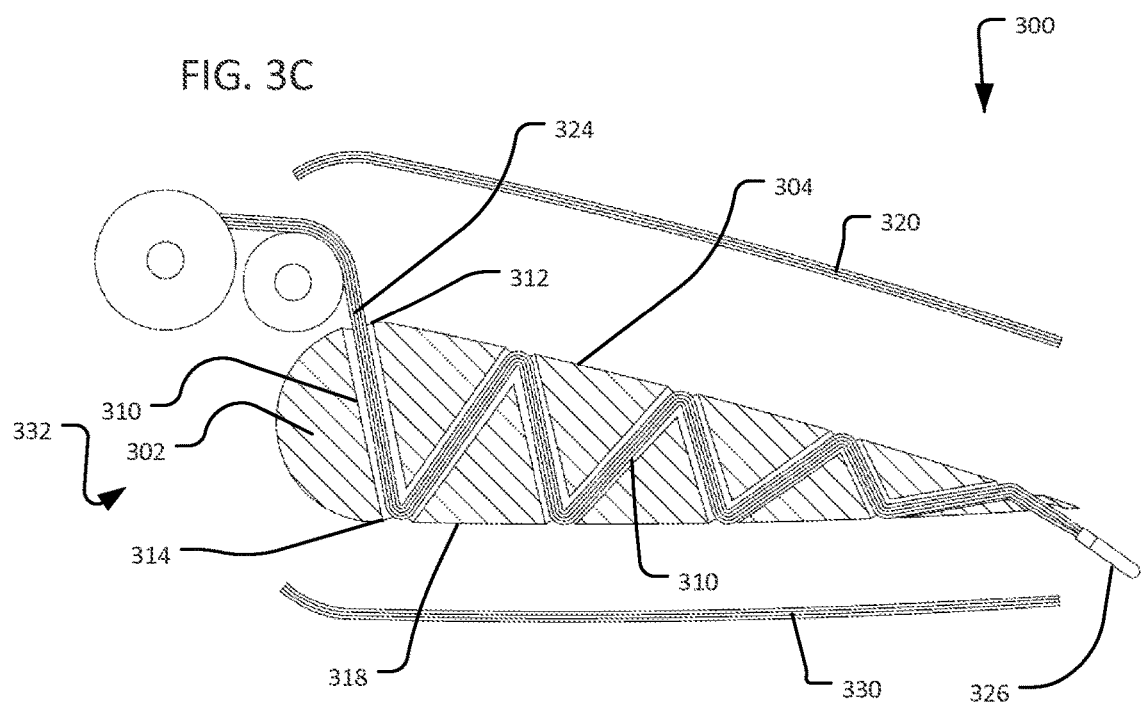

FIG. 3C shows a cutaway side view of a first example of a fiber threading process 332 in accordance with the process 300 of forming a structure with fiber reinforced composite lattice members. In the fiber threading process 332, at least one continuous fiber tow 324 is threaded from an opening 312 in the superior surface 304 and passes through a bore 310 to pass out of an opening 314 in the inferior surface 318. The fiber may be threaded sequentially through multiple bores 310, passing in and out of the pattern 302. The fiber may be threaded manually, for example, using a needle 326 to pull fiber from a source such as a spool 328 and through the bores; or the threading process may be automated. Following the threading process, one or more face sheets 320 and 330 may be added to the working surfaces 304 and 318 of the pattern, such that the face sheet or sheets come into contact with, or into proximity with, at least some of the fiber tows where they encounter the surface of the pattern. This process can result in a fiber pattern such as is shown in FIG. 2A.

In alternative embodiments, more than two face sheets may be used, or a single face sheet may wrap about the pattern forming both superior and inferior faces. A portion of a fiber tow 324 may be threaded through a portion of one or more of the face sheets 320 and 330. The fiber tow 324 may be a single tow that substantially fills the path formed by the bores 310; the fiber tow 324 may be wound multiply through the bores to substantially fill the bores; or multiple fiber tows may be wound in parallel. Additionally, a combination of the above configurations may be used, and particularly for embodiments having bores of multiple sizes. For example, where a sandwich-type lattice structure has faces that are not equidistant at all points, it may be desirable to adjust the thickness of the lattice members according to the distance between the faces. Thus, some shorter bores may be filled with a number of parallel fiber tows; and some longer bores may contain a larger number of parallel fiber tows. The number of fiber tows may vary according to a formula based on, for instance, any or all of the distance of separation of the surface sheets, the relative density of lattice members in that section, or design-specific concerns related to the desired use of the part being fabricated, such as loading points.

The face sheet or sheets may be formed of a variety of materials, for example, they may be any one of, or a combination of multiple of: carbon fiber woven sheets, fiberglass woven sheets, unidirectional sheets, fabric sheets, paper sheets, nonwoven fiber mats, metal sheets that may be flexible or may be rigid and preformed, or other comparable material layers. In at least one embodiment, the face sheet or sheets are predominantly carbon fiber, and may be stacked unidirectional sheets, cross-stacked unidirectional sheets, woven sheets, randomly matted sheets, or a combination of any of the above; and any of said sheets may, in some embodiments, contain composite elements such as additional fibers, which may be for example: Kevlar™, Twaron™, metal fibers (such as, but not limited to, aluminum or steel), glass fibers, or high-strength plastic fibers. In a specific embodiment, fiber sheets may be one or more layers of a uni-directional carbon fiber sheet such as UT-C300™ (made by Gurit, Inc.); and more specifically, embodiments of a face sheet may be four or more layers of the carbon fiber sheet. Generally, face sheets will be assembled with the pattern as one or more dry layers absent any pre-impregnation or infusion with any matrix materials, in embodiments. Prior to matrix infusion, the face sheets are typically pliable and can be shaped according to an arbitrary surface topology of the removable pattern. The face sheets become stiff with the addition and curing of the matrix material in subsequent process acts. However, in some embodiments, face sheets may be either partially or fully pre-impregnated with a matrix material.

Figure 3D:
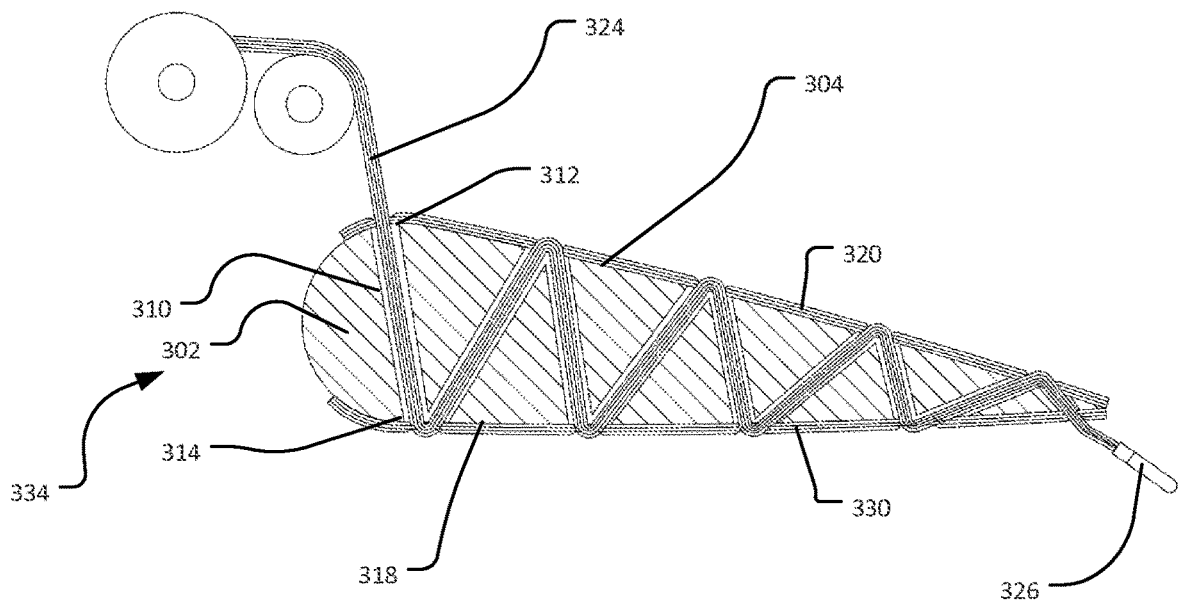

FIG. 3D shows a cutaway side view of a second embodiment of a fiber threading process 334, comparable to the process 332 shown in FIG. 3D, in accordance with embodiments of a composite lattice manufacturing process. In the threading process 334, the one or more face sheets 320 and 330 may be added about a pattern 304 first. Then the fiber tow or tows 324 pass through the openings 312 and 314 in the bores 310 in the threading process. During the threading process, a subset of the fiber tow or tows may be threaded through the one or more face sheets 320 and 330, such as was described with FIGS. 2B and 2C. In embodiments of the process 334, the fiber tow or tows are threaded through the face sheet or sheets 320 and 330 through either or both of through holes punched in the face sheets and through voids formed in the face sheets by the weave of the sheets. Where a fiber tow is threaded through a face sheet, if the face sheet is formed of one or more layers of a fabric (for example, woven carbon fibers), then the fiber tow may be directly interwoven with a portion of the face sheet, or through the entire face sheet. If the face sheet is a contiguous material, the fiber tow may be passed through a set of holes prepared in the face sheet. Furthermore, in accordance with some embodiments, some fiber tows may run in parallel for certain lattice members and diverge or merge at a surface 304 or 318 with other fiber tows.

In some embodiments, a fiber threading process includes elements of both of the above-described threading processes 332 and 334. A portion of the fibers may be threaded through a series of bores in the pattern, as in process 332 (FIG. 3C), prior to the addition of any face sheets. Then, following the addition of face sheets about the pattern, additional fiber tows may be threaded through the bores and also the face sheets, as in process 334 (FIG. 3D).

In some embodiments, the openings 312 and 314 of individual bores 310 may be proximate to, or overlapping with, other individual bores 310 such that a complex path for a fiber tow is formed, whereby fibers passing out of one bore may pass over part of an superior or inferior surface 304 or 318 and pass down a different bore. In some embodiments, three or four (or more, for example, five in a square triangular truss arrangement with a center beam) bores may emerge from the pattern at a shared opening, or with openings proximate to one another at the surface. In this example, the bores are situated predominantly in a square-pyramidal configuration, however, a wide variety of configurations are attainable with these methods.

In at least some embodiments, individual fiber tows generally connect adjacent or proximal lattice members; however, in truss configurations where there exist multiple adjacent lattice members for each lattice members, the individual fiber tows generally connect lattice members in a pattern designed to optimize balance, symmetry, and the resilience of the lattice joints. For example, in embodiments having a pyramidal configuration, at least some fiber tows from each lattice member will turn and join a directly adjacent, abutting lattice member. Where more than two lattice members join at a single peak, fibers from one lattice member may diverge and join with fibers forming two or more other lattice members. Additionally, fiber tows may be periodically tied to the face sheets, or may be tied at the ends, to create additional mechanical stiffness.

FIG. 3E shows a cutaway side view of resin-transfer infusion process 336, in accordance with at least one embodiment. A membrane layer 346 is applied about an assembly of the pattern 302, face sheets 320 and 330, and threaded fibers 324. Following emplacement of the membrane layer 346, a fluid (uncured) matrix material 338 is fed into the enclosed pattern, and the air is removed 340, such that the matrix material fully inundates and penetrates the fiber tows 324 in the bores 310 as well as the face sheets 320 and 330. The lattice members and face sheet may be attached to one another at least in part by coextensive permeation with the matrix material, and may have other attachment means applied in addition to the matrix.

In at least one embodiment, the resin transfer process may be a vacuum-assisted resin transfer molding (VARTM) process. In this process, a vacuum is generated within the membrane layer, and the air pressure difference draws the matrix material to fill voids throughout the dry fibers. In some embodiments, the vacuum is generated within the membrane before the matrix material is fed in order to minimize the possibility of bubbles occurring within the composite; or the vacuum may be generated concurrently with the addition of matrix material. The vacuum process may be conducted at one or at multiple points at an end of the membrane layer 346 distal from the point or points where matrix material 338 is fed, such that the vacuum process causes matrix material to seep from the inlet ports to the outlet ports. The seal of the membrane layer may be enhanced or secured by means of tape or additional material, such as a secondary membrane, applied externally to the membrane layer. The precise number, placement, and means of reinforcement of the inlet and outlet ports of the membrane will vary depending on the geometry of the part, the viscosity of the matrix material, and the specific infusion process selected.

In alternative embodiments having pre-impregnated matrix material in one or more of the face sheets, the resin-transfer infusion process 336 may include a pre-treatment act for softening the pre-impregnated matrix material or causing it to flow fully or partially into the adjacent lattice members. The pre-treatment may include softening by means of applying a chemical solvent or applying heat, or any other suitable means of softening a matrix material.

In some embodiments of a vacuum-assisted resin transfer infusion process, the flow of matrix material is enhanced by the provision of a distribution medium or flow medium. Generally, a distribution medium or flow medium is a course fabric through which a matrix material can quickly spread; but for purposes of this disclosure, distribution medium means any material having similar properties. In at least one embodiment, a peel-ply or release-fabric layer is applied directly to the fiber sheets that will form the part, the distribution medium is positioned outside the peel-ply layer, and the membrane is placed about the entire assembly. The distribution medium provides channels for the fluid matrix material to spread across a broad surface area of the peel-ply layer. The peel-ply layer is porous, or alternatively may be perforated, such that matrix material can pass through the peel-ply layer and into the part over a broad surface area of the part, which enables more thorough and more rapid penetration of the part by the matrix material. The peel ply layer can be removed from the final part, which also removes the distribution medium. In at least one specific embodiment, the distribution medium is KNITFLOW 40™ (made by Gurit, Inc.).

The matrix material in the reinforced fiber/polymer composite may be formed any substance that may be substantially interfused with a fiber network or a fiber tow (or bundle of fiber tows) to lend macro-scale structure or rigidity to the fibers, in accordance with embodiments. As an example, a matrix may be formed from a low viscosity thermoset polymer resin. As specific examples, the matrix material may be one or more of: Epoxy, Vinylester, Polyester, or shape-memory polymer (SMP) such as acrylate-based resins. In certain embodiments, the matrix material may be an epoxy such as, for example, PRIME™ 20LV (made by Gurit Inc.). Alternative embodiments may be formed of thermoplastic polymer resin. The matrix material may be configured to harden by chemical process, heat-induced curing, ultraviolet light or other energy cured process, a combination of one or more of these processes, or other means. For example, in certain embodiments the matrix may be mixed with a hardening agent, such as PRIME™ HARDENER (made by Gurit, Inc.), which provides for an approximate gel time of 30 minutes for the mixture; and may be subsequently hardened by a heat-curing process.

In some embodiments, the resin is allowed to partially cure at room temperature within the membrane layer; and in some specific embodiments, the resin is allowed to cure at room temperature for approximately 12 hours.

FIG. 3F shows a cutaway side view of an example of a curing process 342 using heat 344 from heating elements 348, such as in an oven, to harden the matrix material. In various embodiments, the matrix may be subjected to one or more procedures for curing. For example, the matrix material may contain a mixture of a matrix material and a chemical curing agent (or hardening agent), such that the matrix material and chemical curing agent are mixed prior to infusion, infused into the pattern as described above, and then allowed to cure at or near room temperature for an initial cure. Following initial curing, the part may undergo a second curing process, or a hardening cure, at an elevated temperature. In at least one embodiment, the resin is cured within the membrane layer, or prior to the removal of the membrane layer; but in alternative embodiments, the membrane layer may be removed prior to a curing process. In at least one embodiment, the matrix material may be an epoxy such as epoxy PRIME™ 20LV with a hardening agent such as PRIME™ 20 Fast Hardener (both as supplied by Gurit, Inc.) In a specific embodiment, the hardening cure may be at 65 degrees Celsius; however, the temperature of the hardening cure may vary depending on the particular matrix material and hardening agent selected; or depending on the temperature tolerance of the removable pattern. For example, the hardening cure may be conducted at or above 65 degrees Celsius, or more than 50 degrees Celsius, or another temperature depending on the particular matrix material and pattern material selected. In various embodiments, the time selected for the first and second curing processes may vary. For example, in one specific embodiment, the hardening cure process may include elevating the ambient temperature to approximately 65 degrees Celsius for approximately 7 hours. The hardening cure may include high temperature, high pressure, or (as shown) heat transfer 344 from one or more heating elements 348.

FIG. 3G shows a cutaway side view of an example of a pattern-removal process 350 of the pattern 304 being removed from the cured composite structure, in accordance with at least one embodiment. In this example, the pattern material is removed by melting 352 at a high temperature. The pattern material may be removed mechanically, chemically by addition of a solvent, may be melted, or some combination of the above. In some embodiments, all of the pattern material may be removed; or alternatively, a portion of the pattern material may be left behind. Following removal of the pattern material, a structure remains formed of face sheets 320 and 330 and a complex lattice of composite fiber tows 324 in a cured matrix.

The bore size, spacing, and positions may vary in embodiments according to the structure desired. The bores may be drilled at almost any angle, which permits the creation of lattice structures at levels of complexity that have heretofore been impossible to produce using conventional means. In an alternative embodiment of the process 300, a mold has features supporting removable beams such that the mold and beams may be used simultaneously to form a portion or all of the bores about the removable beams.

In embodiments of the method of manufacturing a lattice structure such as the process 300 shown in FIGS. 3A-3G, various process acts may be performed in different orders. For example, fiber winding processes 332 and 334 may be performed in either order, singly or together, in accordance with embodiments. In some embodiments, a fiber tow 324 may be wound through the pattern 302 prior to the addition of any face sheets; and then one or more face sheets 320 may be added thereto. In some other embodiments, one or more intermediate face sheets 320 may be added, a fiber tow 324 wound through portions of the face sheet or sheets, and then one or more additional face sheets added on top of the intermediate face sheet or sheets and fiber tow. Other embodiments may include aspects of both: a fiber tow may be wound through the pattern prior to the addition of any face sheets, subsequently interwoven with one or more intermediate face sheets, and then one or more additional face sheets may be added. Alternative embodiments may be assembled using a variety of comparable fiber tow winding and face sheet layering orders.

In an alternate embodiment, instead of having two face sheets on opposite sides of a lattice structure, a single panel sheet can be used, with stringers on the opposite side. In still further embodiments, stringers could be used on both sides of the lattice structure. As is known, a stringer is a longitudinal structural piece in a framework. Utilizing a set of stringers instead of a sheet permits a structure to be lighter.

Figure 4A:
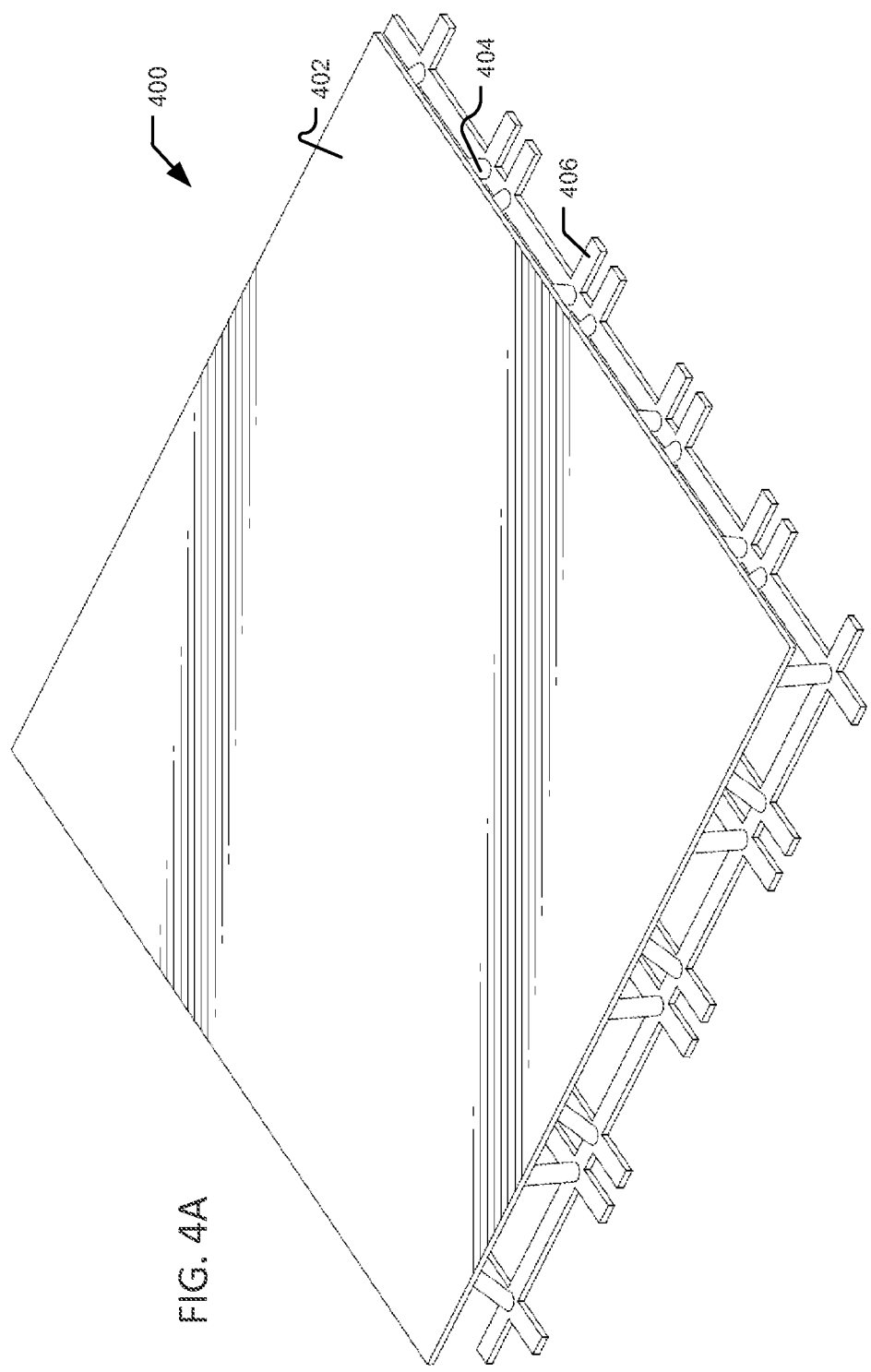
Figure 4C:
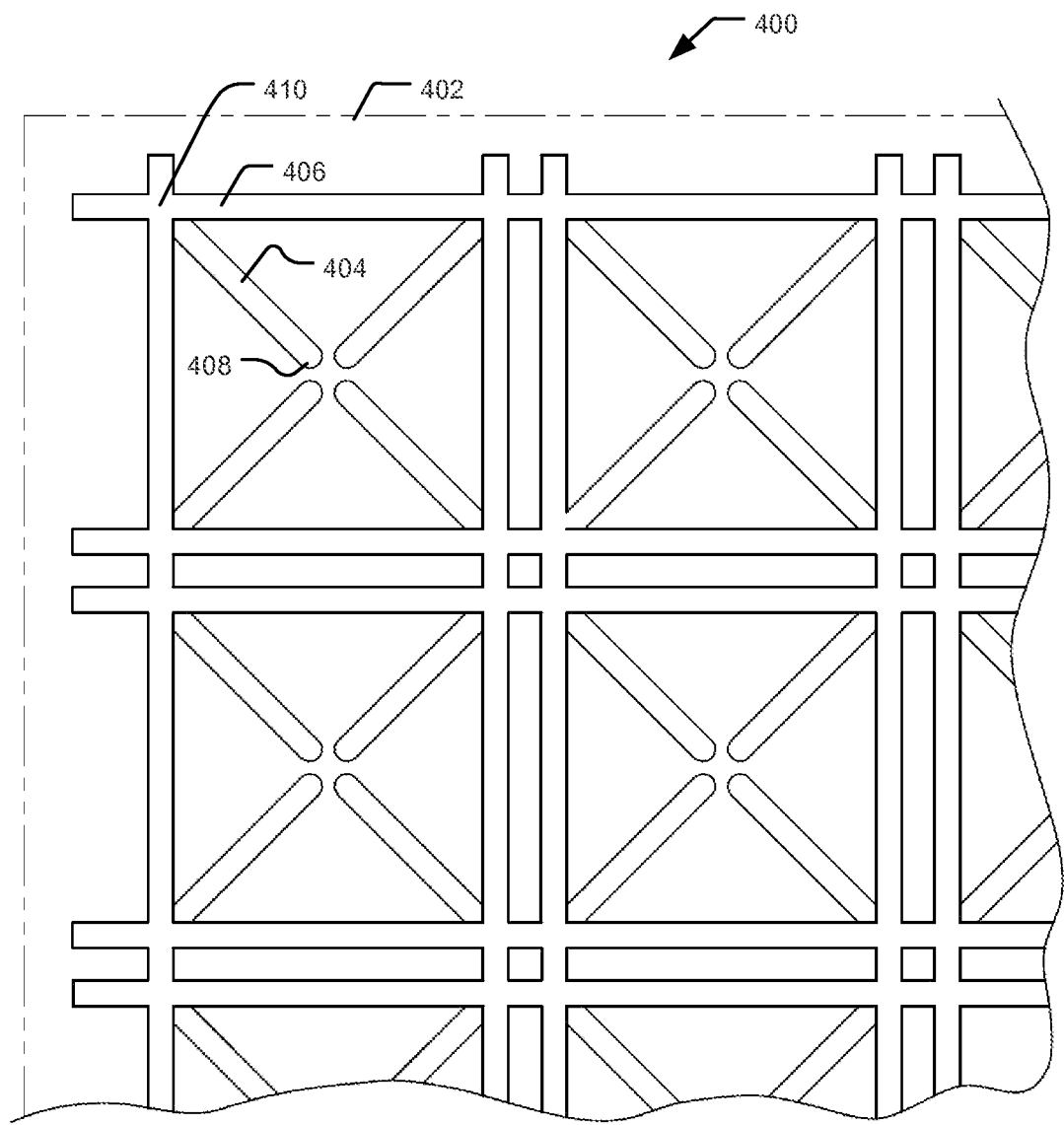

For example, FIGS. 4A-4C show a composite single-skinned sandwich structure 400 in accordance with an embodiment, in a variety views, including: a perspective view (FIG. 4A), an inverted perspective view (FIG. 4B), and a top-down view (FIG. 4C). The composite single-skinned sandwich structure 400 includes a face sheet 402 attached to one side of lattice members 404, and a plurality of stringers 406 attached on an opposite side of the lattice members. FIG. 4B shows an inverted perspective view of the composite single-skinned sandwich structure 400, which more clearly illustrates parts of the structure, including: lattice/stringer attachment points 410, where the lattice members 404 and stringers 406 join; and lattice/face sheet attachment points 408, where the lattice members and the face sheet join. FIG. 4C shows a top-down perspective view of the sandwich structure 400. As with previous embodiments, the lattice structure can take a variety of different forms. In the structure 400, the lattice members 404 form a substantially square-pyramidal structure.

The stringers can be straight or curved, and can be combined to take any form, but typically are combined to form an interconnected network formed in a single plane against the side of the lattice members. The interconnected network, in embodiments, is arranged to align with the lattice members. For example, in the embodiment shown in the drawings, where the lattice members 404 are a pyramidal shape with the apex facing the stringers, the stringers form a pattern with lattice/face sheet attachment points meeting at an apex of the square pyramidal truss shape of the lattice members 404, and lattice/stringer attachment points 410 meeting at corners of a base of a pyramidal truss shape. Stringers 406 are arrayed in a square cross-hatched configuration, where adjacent parallel stringers are separated by a small distance, such that the lattice/stringer attachment points 410 of adjacent pyramidal structures are arrayed near one another in a repeating configuration.

The face sheet 402, lattice members 404, and stringers 406 are connected together to form the single-skinned sandwich structure 400 which may have various structural properties depending on the specific arrangement and material choice of the lattice members 404 and stringers 406. In the single-skinned sandwich structure 400 shown, the lattice provides structural stiffness such that the structure can bear significant loading on the face sheet. The stringers 406 are connected with the base ends of pyramidal truss-like shapes formed by the lattice members 404, such that when the face sheet 402 is loaded, the pyramidal truss-like shapes tend toward expansion, putting the stringers 406 in tension. This tensile loading regime provides a high strength-to-weight ratio in the overall structure. Depending on the materials and thickness of the lattice members 404, stringers 406, and face sheet 402, the single-skinned lattice structure 400 may be designed so as to consume considerable energy under high-load, impact, or blast conditions. The face sheet 402 may be formed of any combination of composite fabric materials described above. In specific embodiments, the face sheet 402 may be a stack of four carbon fiber sheets arrayed at 0 degrees, 90 degrees, 0 degrees, and 90 degrees.

As with previous embodiments, a removable pattern, such as is described above, can be used to form the stringers and lattice members of a structure, such as the structure 400. Fiber tows can extend through and form parts of both a truss of a lattice member and a stringer. Alternatively, a first set of fiber tows can be used to form the lattice members, and a second set to form the stringers, with the two sets being joined by the resin matrix. For example, FIG. 5 shows a removable pattern 500 for a process of making the single-skinned sandwich structure 400 of FIGS. 1A-1C. The removable pattern 500 includes a superior surface 502a and an inferior surface 502b, and bores 504 passing through the removable pattern 500 connecting the superior and inferior surfaces 502a, 502b. The bores 504 intersect with the superior surface 502a at superior surface holes 508. The superior surface holes 508 of adjacent bores 504 are positioned proximate to one another, so that the adjacent superior surface holes meet at apexes of a truss-like structure formed of the bores in the removable pattern 500. In various embodiments, the adjacent superior surface holes 508 of the adjacent bores 504 may be separated by a small distance (on the order of 0 to 2 diameters of the bores); may be directly adjacent or touching; may partially overlap; or may fully overlap. In some embodiments, a portion of the removable pattern 500 between two adjacent superior surface holes 508 may be beveled or decreased in height, providing room for part of a fiber tow or bundle of fiber tows to run between adjacent bores 504 without breaking the plane of the superior surface 502a. The bores 504 meet the inferior surface 502b of the removable pattern at inferior surface holes 510. The inferior surface holes 510 exit into stringer grooves 506 cut from or formed into the removable pattern 500 in a pattern according to the desired layout of the stringers. For example, as shown, the stringer grooves 506 are laid out in a square cross-hatched pattern.

The stringer grooves 506 have a depth and width to accommodate a stringer, which may have any suitable cross-sectional area. The cross-hatched pattern may be formed of cross-hatches single grooves, cross-hatched double grooves (as shown in FIG. 5), or other suitable variations on a number of adjacent grooves. In embodiments of a removable pattern for a square-based lattice, such as the square-pyramidal lattice structure shown, the stringer pattern may be a square cross-hatched pattern; but for a removable pattern for a lattice that has a non-square base (for example, a triangular pyramidal lattice) the stringer pattern may be a triangular cross-hatched pattern, with single, double, or more adjacent stringer grooves forming the pattern. For other forms of lattice, other suitable stringer patterns may be used. In embodiments of a removable pattern having cross-hatched double grooves, as shown, the inferior surface holes 510 of the bores 504 are proximate to the inferior surface holes of adjacent bores; but separated by a distance of the separation between the doubled stringer grooves 506. In embodiments having single grooves, the inferior surface holes may meet or overlap in a manner similar to the superior surface holes 508. Alternative embodiments of the removable pattern 500 may also lack stringer grooves entirely and instead rely on other means of securing a stringer path on the inferior surface 502b of the removable pattern. Suitable means for securing the stringer path may include, but are not limited to: adhesion, positive surface features on the inferior surface 502b aligned with stringer paths, mechanical attachment, pressure or an externally applied mask or tape; and removable blocks or plates attached with the inferior surface 502b.

Figure 6A:
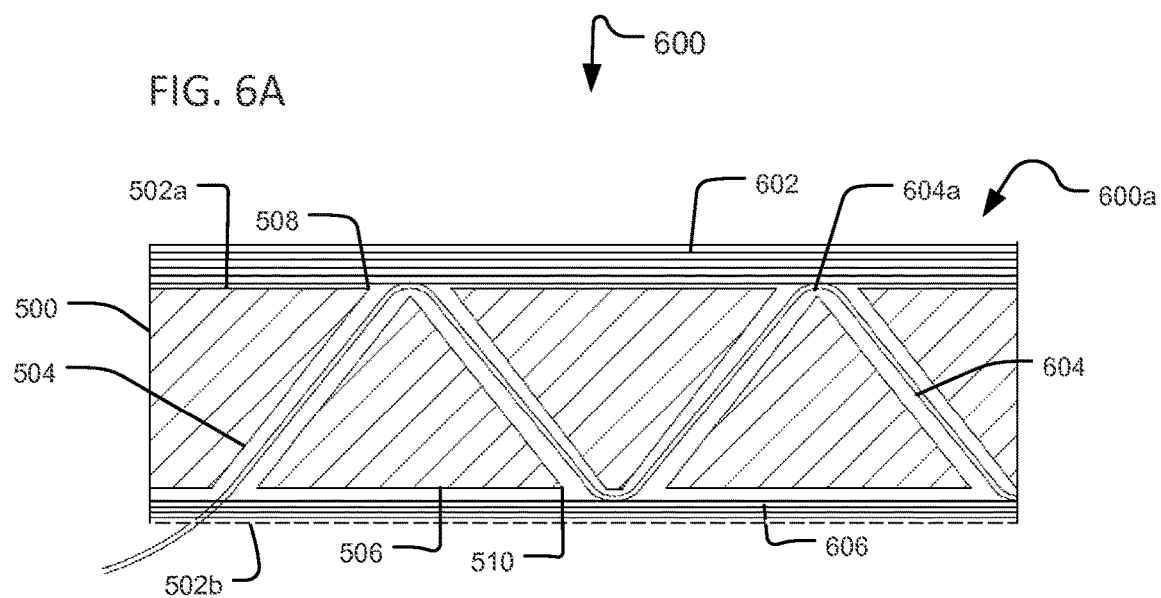
FIGS. 6A-6D show stages of a process of making a single skinned sandwich structure, such as the structure shown in FIGS. 4A-4C in accordance with embodiments.

FIGS. 6A-6D are partial cutaway views representing stages of a process 600 of making a single skinned sandwich structure, such as the structure shown in FIGS. 4A-4C. The process utilizes the removable pattern 500 of FIG. 5, where the cutaway section view shows a plane through a stringer groove 506 and through a series of bores 504. FIG. 6A shows an example of a first assembly process act 600a of winding a first subset 604a of a fiber tow 604 through bores 504 in the removable pattern 500, in accordance with embodiments. The face sheet 602 is applied to the superior surface 502a of the removable pattern 500; and stringer fibers 606 are emplaced in the stringer groove 506. The first subset 604a of the fiber tow bundle 604 is wound through adjacent bores 502, exiting and entering the removable pattern 500 at adjacent superior surface holes 508 and inferior surface holes 510. The first subset 604a of the fiber tow 604 abuts without interweaving through the face sheet 602 and the stringer fibers 606. The fiber tows 604 may be wound through the bores 504 using any of the winding means discussed above.

Figure 6B:
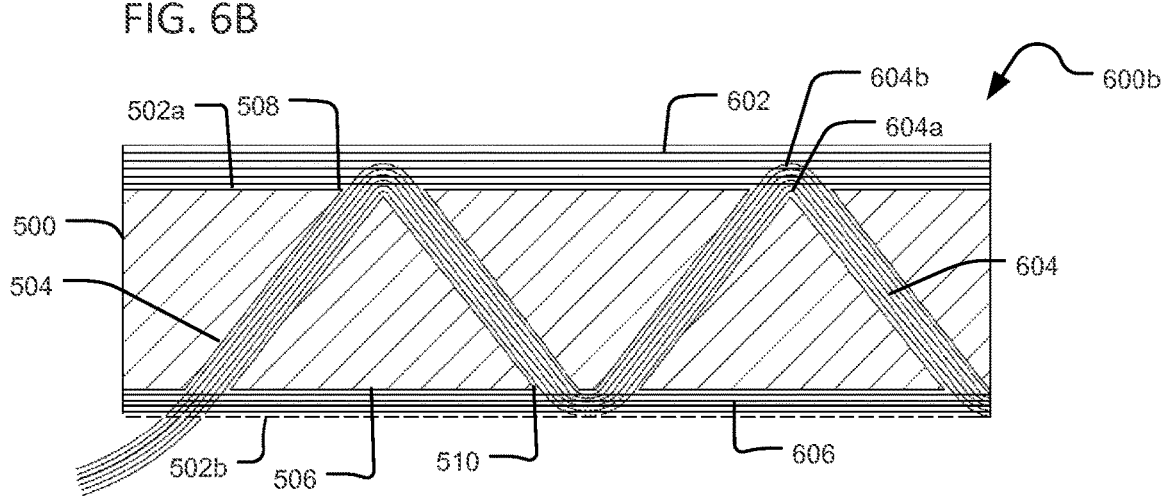

FIG. 6B shows an example of a second assembly process act 600b of weaving a fiber tow bundle 604 through a face sheet 602 and stringer fibers 606 abutting the removable pattern 500 shown in FIG. 6A, in accordance with embodiments. A second subset 604b of a fiber tow bundle 604 is interwoven with the face sheet 602 where it exits and enters at superior surface holes 508; and interwoven with the stringer fibers 606 at the inferior surface holes 510 and along portions of the stringer grooves 506. The fiber tows 604 may be woven through the bores 504 and through either or both of the face sheet 602 and/or stringer fibers 606 using any of the winding or weaving means discussed above.

In alternative embodiments, the fiber tow bundle 604 may be a single fiber tow; and the entire fiber tow may abut without interweaving with either or both of the face sheet 602 and stringer fibers 606; or the entire fiber tow may interweave with a portion of the face sheet 602 and/or the stringer fibers 606. In some embodiments, different fiber tows may alternatingly pass throughout two adjacent bores 504 and then run alongside or interwoven with a section of the fiber stringers 606 in the stringer grooves 506. In some embodiments, the fiber stringers 606 may be substantially formed from, or entirely formed from, portions of the same fiber tows as the fiber tows 604 that pass through the bores 504.

In some alternative embodiments, any subset of the fiber stringers may be substantially absent, or replaced with non-fiber stringer members or a combination of fiber and non-fiber stringer members. Non-fiber members may include, for example: actuation members such as piezoelectric devices, shape memory materials, thermal or electrical insulating materials, wires or other conductive means, rigid structural members such as metal structural beams, carbon fibers or other suitable fibers for a composite fiber, or any other suitable material or any suitable combination of materials. For example, a structure including actuators in an aircraft structure may be capable of changing shape during operation, obviating the necessity of separate parts for actuating aerodynamic structures during flight. Such techniques may replace heavy hydraulic systems that are conventional in aerospace design. In some embodiments, any of the above, or any suitable material, may also be interwoven with, surrounded by, and/or laid in parallel with one or more fiber tows.

Figure 6C:
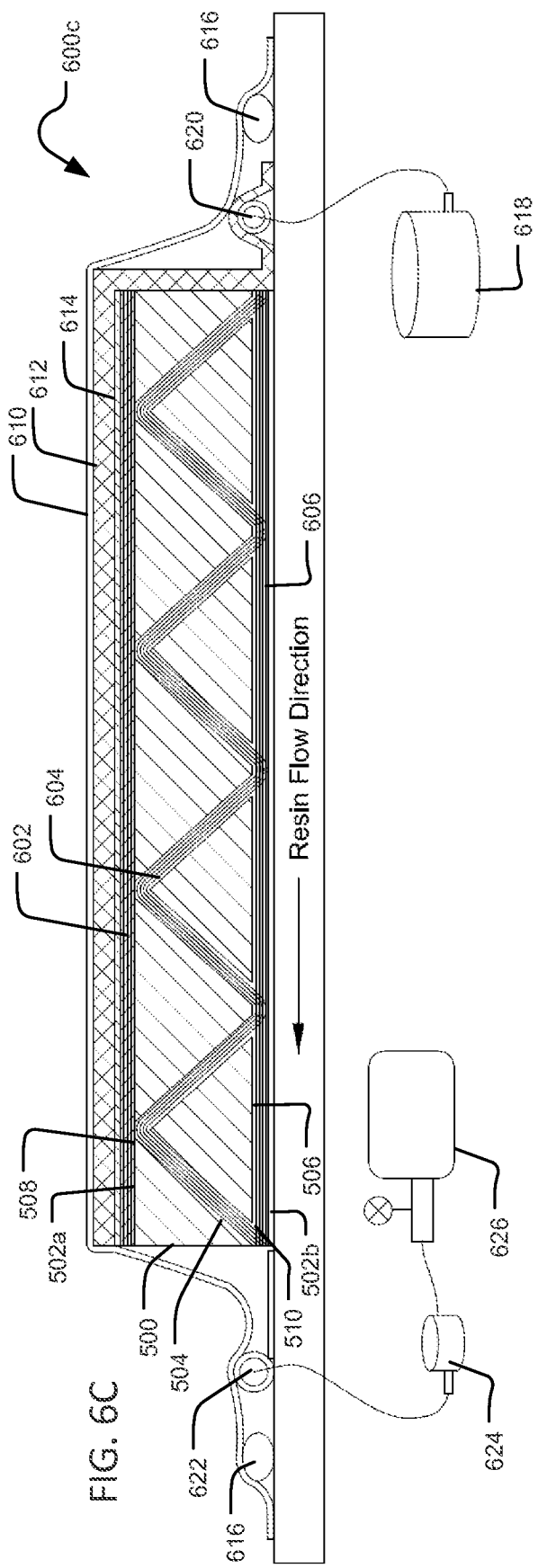

FIG. 6C shows an example of a process act of interfusing the assembly of a face sheet, fiber tows, stringers and the removable pattern shown in FIG. 6B with a matrix by way of a vacuum-assisted resin transfer process 600c. The vacuum assisted resin transfer process 600c includes situating the assembly of the removable pattern 500, face sheet 602, fiber tows 604, and stringer fibers 606 (or alternative stringer members, as described above) within a vacuum membrane 610. The vacuum membrane 610 is sufficiently gas-impermeable that a vacuum pump 626 or compressor is able to draw a vacuum within the membrane, and is sealed against the atmosphere with tape 616 or other sealing means. Also within the vacuum membrane 610, a flow medium 612 is assembled surrounding a portion of the assembled removable pattern 500 and face sheet 602; and a peel-ply membrane 614 is assembled abutting at least a portion of the face sheet. During the resin transfer process 600c, the vacuum pump 626 draws vacuum within the interior of the vacuum membrane 610. This vacuum draws a resin, which may be a mixture of a resin and a curing agent in accordance with processes described above, from a resin reservoir 618 and through an inlet port 620 that feeds resin into the flow medium 612. The flow medium 612 permits the resin to quickly reach a relatively large surface area surrounding the removable pattern 500 and face sheet 602. The resin permeates through the peel-ply membrane 614 and interfuses throughout the face sheet 620 on the superior surface 502a of the removable pattern 500, interfuses throughout the fiber tows 604 in the bores 504 of the pattern; and throughout the stringer fibers 606 (or other stringer members) in the stringer grooves 506 in the pattern, before exiting the interior of the vacuum membrane 610 by way of an exit port 622. Excess resin is retained in a resin trap 624 that protects the vacuum pump 626. In alternative embodiments, any other suitable resin transfer process, such as processes described above, may be used for permeating the face sheet and fiber tows with a resin.

Figure 6D:
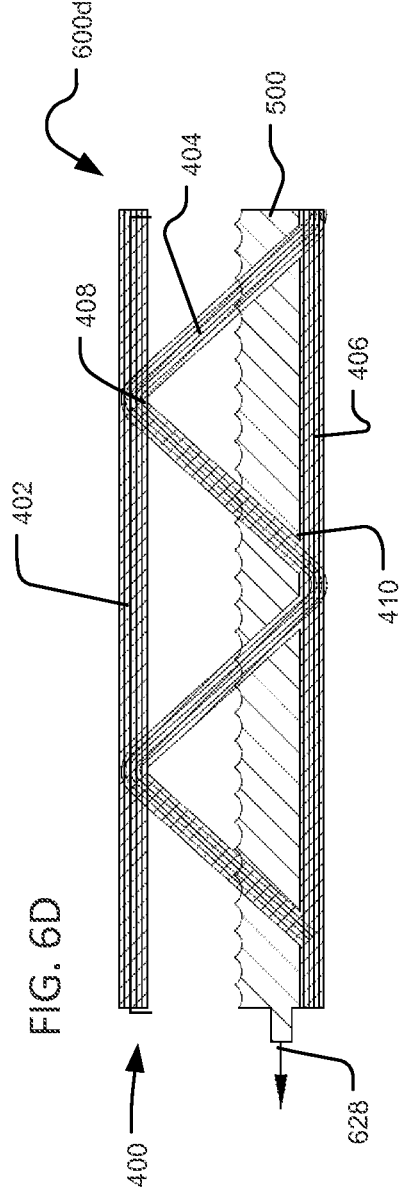

FIG. 6D shows an example of a process act 600c of removing the removable pattern 500 shown in FIGS. 6A-6C in order to release the single-skinned sandwich structure 400. After a curing process, the pattern 500 may be removed using any suitable pattern removal technique, such as the techniques described with relation to FIG. 3G.

Figure 7A:
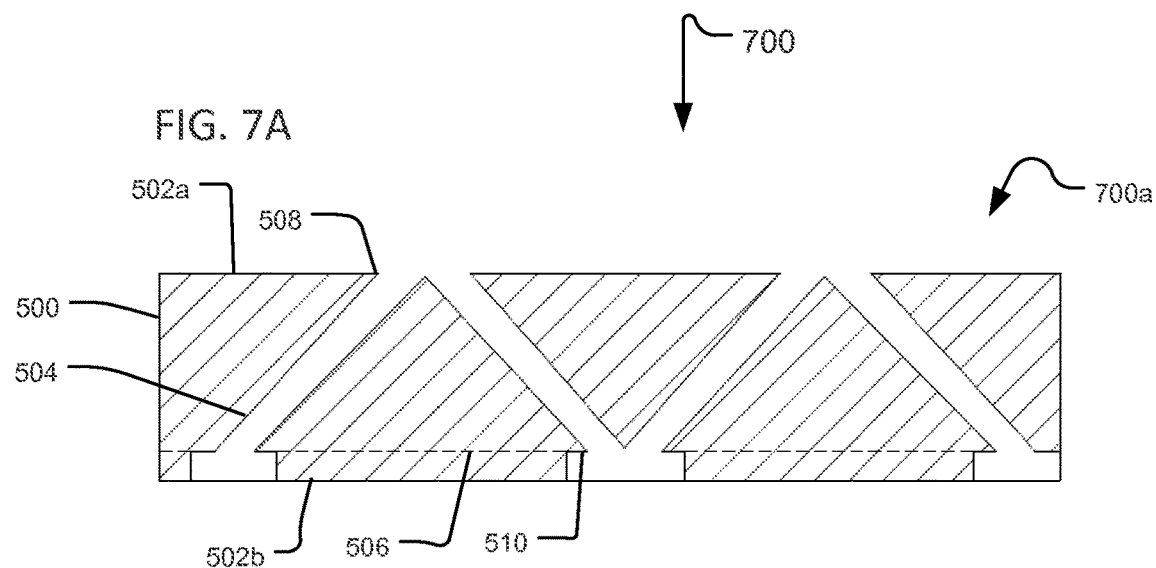
FIG. 7A-7B show an alternative exemplary process for winding a fiber tow through bores in the removable pattern of FIG. 5, including: a cross-sectional view of the removable pattern (FIG. 7A) along a diagonal and a cross-sectional view representing winding a fiber tow through bores in the removable pattern (FIG. 7B).
Figure 7B:
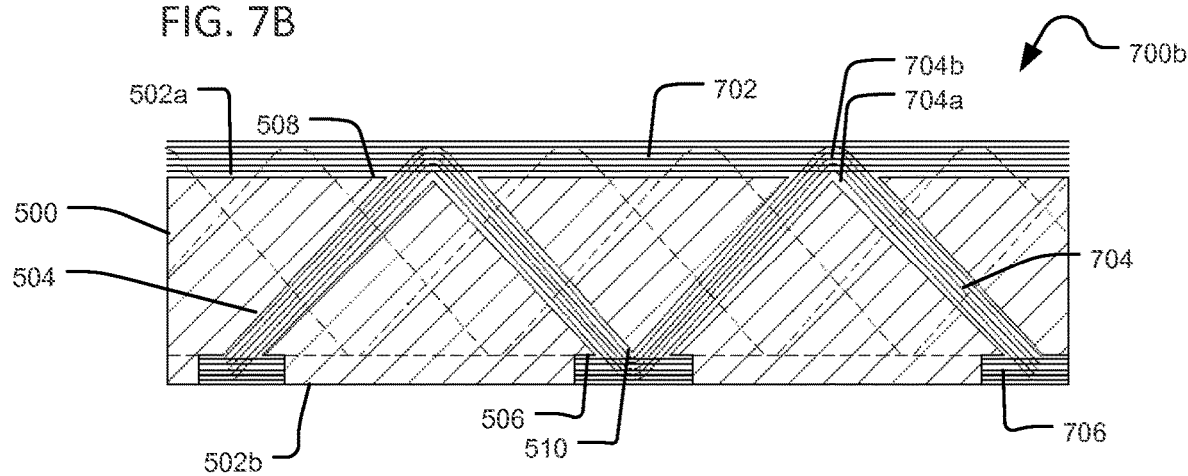

FIG. 7A-7B show an alternative exemplary process 700 for winding a fiber tow through bores in the removable pattern 500 of FIG. 5. FIG. 7A shows an alternative cross-sectional view 700a of the removable pattern 500 along a plane that runs diagonally relative to the stringer grooves 510; and FIG. 7B shows an example of a process act 700b of winding a fiber tows 704 through bores 504 in the removable pattern (FIG. 7B), in accordance with embodiments. A first subset 704a of fiber tows is wound sequentially through two or more bores 504 that run between the superior and inferior faces 502a and 502b of the removable pattern 500. A face sheet 702 is added to the superior surface 502a of the removable pattern 500, and then a second subset 704b of the fiber tows 704 is wound through the bores 504 and interwoven with a portion of the face sheet 702. A series of stringers 706 are added to the stringer grooves 506, and the second subset 704b of the fiber tows 704 is also interwoven with a portion of the stringers.

In alternative embodiments, a process of winding a fiber tow through bores in a removable pattern may include aspects of both processes 600 and 700 as described above. For example, a subset of fiber tows may be wound in a direction conforming to the winding processes 600a and 600b (shown in FIGS. 6A-6B); and a second subset of fiber tows may be wound in a direction conforming with the winding process 700b (shown in FIG. 7B). In addition, the first subsets of fibers 604a and 704a described in FIGS. 6B and 7B may be omitted in favor of a set of fiber tows that winds through the face sheet and the stringers; or the second subsets of fiber tows 604b and 704b described in FIGS. 6B and 7B may be omitted in favor of a set of fiber tows that abuts the face sheet and stringers without being interwoven; or a process of winding the fibers may include aspects of both embodiments, for example, including fiber tows that are interwoven with the face sheet but not interwoven with the stringers, or vice versa. In some embodiments, individual fiber tows may be wound according to paths that run parallel to a stringer in parts and diagonal relative to a stringer in other parts.

Embodiments of these methods may be applied in part or in whole to form a broad array of complex lattice structures, with or without an outer skin or skins. In accordance with several embodiments, these methods are ideally suited to producing hollow or sandwich-type structures with two opposed outer surfaces and a supporting lattice within. An airfoil is one example of a structure for which these techniques may be well-suited. Other structures which may be beneficially made by these methods include: wind-turbine blade members; sections of concentric tubular structural members such as an aircraft body; prefabricated sections for building construction; lightweight structural elements for sports equipment such as bicycle frames, surfboards, racing vessels, and vehicles, or insulating sections of vehicles or buildings; among others.

Embodiments of the methods herein described are also suited to produce lattice structures having a wide range of arbitrary geometries, depending on the specific size, shape, strength, weight, and other desired characteristics of the desired structure. Therefore, while specific lattice structures may be shown or described herein, embodiments may encompass a wide variety of structures not explicitly described. The lattice members may or may not be configured as straight beams, and may or may not cross or join at vertices. At least some embodiments are directed to a complex three-dimensional lattice separating at least two separated face sheets in a sandwich configuration. At least some other embodiments include structures having a continuous face sheet. Such embodiments may include, for example, cylindrical, wheel-shaped, or tubular structures; or structures having a single face sheet with a prominent bend, such as an airfoil or turbine blade.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A single-skinned composite lattice structure, comprising:
   a face sheet formed of more than one layer of fiber fabric;
   a plurality of stringers; and
   a plurality of linear lattice members extending between the face sheet and the plurality of stringers and connecting with the face sheet and the plurality of stringers at a plurality of points, with at least one fiber tow extending through and forming a part of at least two of the plurality of lattice members; and a matrix material interfused with the at least one fiber tow and interfused into the face sheet to enhance weight savings by reducing sections of the composite lattice structure that are infused with the matrix material,
   wherein the at least one fiber tow both abuts and weaves through the face sheet to form the single-skinned composite lattice structure,
   the plurality of linear lattice members run in a pattern along a length of the single-skinned composite lattice structure forming pyramidal truss-like shapes,
   and the plurality of stringers are connected with base ends of the pyramidal truss-like shapes formed by the plurality of linear lattice members, such that when the face sheet is loaded, the pyramidal truss-like shapes tend toward expansion putting the plurality of stringers in tension and thereby resulting in the single-skinned composite lattice structure being capable of consuming energy under high-load, impact, or blast conditions.

2. The single-skinned composite lattice structure of claim 1, wherein:
   at least a first fiber tow abuts an inferior surface of the face sheet.

3. The single-skinned composite lattice structure of claim 2, wherein:
   at least a second fiber tow is woven through a first portion of the face sheet from the inferior surface to a superior surface and returns through a second portion of the face sheet from the superior surface to the inferior surface.

4. The single-skinned composite lattice structure of claim 1, wherein: at least a first fiber tow abuts a first portion of at least one of the plurality of stringers.

5. The single-skinned composite lattice structure of claim 4, wherein: at least a second fiber tow winds about a second portion of the at least one of the plurality of stringers.

6. The single-skinned composite lattice structure of claim 5, wherein the stringers comprise fibers, and wherein the matrix material is further infused throughout the plurality of fiber stringers.

7. The single-skinned composite lattice structure of claim 6, wherein the fiber stringers comprise carbon fiber.

8. The single-skinned composite lattice structure of claim 1, wherein:
   each lattice member forming the pyramidal truss-like shapes has a face-sheet end and a stringer-end; and
   each stringer-end of each lattice member is connected with at least two stringers at an intersection between the stringers.

9. The single-skinned composite lattice structure of claim 8, wherein:
   the plurality of stringers is arranged in a square cross-hatched pattern, such that intersecting pairs of stringers are orthogonal to each other; and
   adjacent stringer-ends of adjacent lattice members are connected to adjacent intersections in the cross-hatched pattern.

10. The single-skinned composite lattice structure of claim 8, wherein:

the plurality of stringers is arranged in a triangular crossing pattern, such that intersecting stringers are arranged at acute angles to each other; and adjacent stringer-ends of adjacent lattice members are connected to adjacent intersections of stringers, such that the lattice forms a three-sided pyramidal truss pattern.

11. The single-skinned composite lattice structure of claim 1, wherein the face sheet comprises a plurality of carbon fiber sheets arrayed in a stack; and the stack is arranged in a plurality of ply orientations.

12. A composite lattice structure, comprising:

a face sheet formed of more than one layer of fiber fabric;

a plurality of stringers; and two or more lattice members extending between the face sheet and the plurality of stringers, wherein the two or more lattice members comprise:

at least two fiber tows; wherein each fiber tow of the at least two fiber tows extends through and forms a part of a plurality of the lattice members and is in contact with the face sheet at a plurality of points on a surface of the face sheet and is in contact with at least one of the plurality of stringers, and wherein each fiber tow of the at least two fiber tows is substantially parallel and straight for a length of a first lattice member, curves proximate to the face sheet, then straightens again within a second lattice member; and the at least two fiber tows and the face sheet are fixed in a contiguous matrix with a matrix material, wherein the at least two fiber tows are interfused with the matrix material and the matrix material is interfused into the face sheet to enhance weight savings by reducing sections of the composite lattice structure that are infused with the matrix material, the two or more lattice members run in a pattern along a length of the composite lattice structure forming pyramidal truss-like shapes, and the plurality of stringers are connected with base ends of the pyramidal truss-like shapes formed by the two or more lattice members, such that when the face sheet is loaded, the pyramidal truss-like shapes tend toward expansion putting the plurality of stringers in tension and thereby resulting in the composite lattice structure being capable of consuming energy under high-load, impact, or blast conditions.

13. The composite lattice structure of claim 12, wherein the plurality of stringers is also fixed in the contiguous matrix with the interfused matrix material.

14. The composite lattice structure of claim 12, wherein a first subset of the at least two fiber tows abuts an inferior surface of the face sheet; and a second subset of the at least two fiber tows is interwoven with at least a portion of the face sheet.

15. The composite lattice structure of claim 14, wherein the face sheet further comprises a plurality of carbon fiber sheets arrayed in a stack; and wherein the second subset of the at least two fiber tows is interwoven with at least an inferior layer of the stack, and is not interwoven with at least a superior layer of the stack.

16. The composite lattice structure of claim 12, wherein the plurality of stringers further comprises a strain sensor.

17. The composite lattice structure of claim 12, wherein the plurality of stringers further comprises an actuator for changing a length of one or more of the plurality of stringers.

18. The composite lattice structure of claim 12, wherein the plurality of stringers further comprises a shape memory material for changing a length of one or more of the plurality of stringers.

* * * * *